US011132636B2

United States Patent
Arunachalam et al.

(10) Patent No.: US 11,132,636 B2
(45) Date of Patent: *Sep. 28, 2021

(54) SYSTEM AND METHOD FOR MONITORING AND SHARING LOCATION AND ACTIVITY OF DEVICES

(71) Applicant: Aeris Communications, Inc., San Jose, CA (US)

(72) Inventors: Sundararaj Arunachalam, Naperville, IL (US); Subramanian Balakrishnan, Cupertino, CA (US); Gurinder Singh Dhillon, Sunnyvale, CA (US); Ryan David Kennedy, Naperville, IL (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/936,588

(22) Filed: Jul. 23, 2020

(65) Prior Publication Data

US 2021/0004759 A1  Jan. 7, 2021

Related U.S. Application Data

(63) Continuation-in-part of application No. 16/014,159, filed on Jun. 21, 2018, now Pat. No. 10,735,904.

(Continued)

(51) Int. Cl.
*G06Q 10/08* (2012.01)
*H04L 29/08* (2006.01)
(Continued)

(52) U.S. Cl.
CPC ......... *G06Q 10/0833* (2013.01); *H04L 67/12* (2013.01); *H04W 4/44* (2018.02); *H04W 4/70* (2018.02)

(58) Field of Classification Search
CPC ..... H04W 4/029; H04W 4/021; H04W 4/023; H04W 4/44; H04W 4/70; H04L 67/12;
(Continued)

(56) References Cited

U.S. PATENT DOCUMENTS 6,239,707 B1   5/2001 Park
6,496,775 B2  12/2002 McDonald, Jr.
(Continued)

FOREIGN PATENT DOCUMENTS

CN     104835029   8/2015
WO    2014106299   7/2014
(Continued)

OTHER PUBLICATIONS

Perera et al., Energy Efficient Location and Activity-aware On-Demand Mobile Distributed Sensing Platform for Sensing as a Service in IoT Clouds, http://arxiv.org/abs/1601.00428, Apr. 1, 2016.

(Continued)

*Primary Examiner* — Brandon J Miller
(74) *Attorney, Agent, or Firm* — Brundidge & Stanger, P.C.

(57) ABSTRACT

A computer-implemented method and system for providing job status information for an IoT device are disclosed. The method providing job status information includes receiving location information of an IoT device; receiving job assignment information for the IoT device; evaluating the location information to determine the job status for the IoT device based on a specified condition; and sharing the job status information for the IoT device. The system for providing job status information includes an IoT device, a job management platform (JMP) and a user interface, wherein the JMP further comprises a storage database for receiving location information of the IoT device and job assignment information for (Continued)

the IoT device; and an analytics engine for evaluating the location information to determine the job status for the IoT device based on a specified condition; and wherein the JMP shares the job status information for the IoT device.

27 Claims, 28 Drawing Sheets

Related U.S. Application Data

(60) Provisional application No. 62/523,749, filed on Jun. 22, 2017.

(51) Int. Cl.
    *H04W 4/70* (2018.01)
    *H04W 4/44* (2018.01)

(58) Field of Classification Search
    CPC ....... G06Q 10/063114; G06Q 10/0833; G01C 5/008; G01C 21/343; G01C 21/00
    See application file for complete search history.

(56) References Cited

U.S. PATENT DOCUMENTS

| | | |
|---|---|---|
| 6,651,001 B2 | 11/2003 | Apsell |
| 6,687,356 B1 | 2/2004 | Glitho |
| 6,931,309 B2 | 8/2005 | Phelan |
| 7,213,048 B1 | 5/2007 | Parupudi |
| 7,246,009 B2 | 7/2007 | Hamblen |
| 7,801,538 B2 | 9/2010 | Weiser |
| 7,848,765 B2 | 12/2010 | Phillips |
| 8,000,726 B2 | 8/2011 | Altman |
| 8,018,329 B2 | 9/2011 | Morgan |
| 8,135,505 B2 | 3/2012 | Vengroff |
| 8,346,230 B2 | 1/2013 | Goodman |
| 8,473,148 B2 | 6/2013 | Nielsen |
| 8,510,200 B2 | 8/2013 | Pearlman |
| 8,566,014 B1 | 10/2013 | Kozolchyk |
| 8,589,330 B2 | 11/2013 | Petersen |
| 8,593,277 B2 | 11/2013 | Nath |
| 8,595,696 B2 | 11/2013 | Maximilien et al. |
| 8,630,768 B2 | 1/2014 | McClellan |
| 8,667,456 B1 | 3/2014 | Czymontek |
| 8,725,569 B2 | 5/2014 | Liang |
| 8,755,824 B1 | 6/2014 | Wang |
| 8,756,010 B2 | 6/2014 | Gupta |
| 8,869,038 B2 | 10/2014 | Eick |
| 8,909,256 B2 | 12/2014 | Fraccaroli |
| 8,913,983 B2 | 12/2014 | Lorello |
| 8,949,022 B1 | 2/2015 | Fahrner |
| 8,971,930 B2 | 3/2015 | Li |
| 9,014,888 B2 | 4/2015 | Sukkarié |
| 9,043,222 B1 | 5/2015 | Kerr |
| 9,076,009 B2 | 7/2015 | Sathish |
| 9,076,165 B2 | 7/2015 | Busch |
| 9,104,738 B2 | 8/2015 | Kay et al. |
| 9,119,038 B2 | 8/2015 | Woods |
| 9,122,693 B2 | 9/2015 | Blom |
| 9,140,567 B2 | 9/2015 | Fryer |
| 9,141,266 B2 | 9/2015 | McCormick |
| 9,146,721 B1 | 9/2015 | Nagaraja |
| 9,210,534 B1 | 12/2015 | Matthieu |
| 9,225,519 B1 | 12/2015 | Fraccaroli |
| 9,250,887 B2 | 2/2016 | Lucovsky |
| 9,275,114 B2 | 3/2016 | Milton |
| 9,277,362 B2 | 3/2016 | Li |
| 9,349,128 B1 | 5/2016 | Kerr |
| 9,424,751 B2 | 8/2016 | Hodges |
| 9,507,346 B1 | 11/2016 | Levinson |
| 9,576,295 B2 | 2/2017 | Volpe |
| 9,615,202 B2 | 4/2017 | Dal Santo |
| 9,661,470 B1 | 5/2017 | Du Bois |
| 9,712,486 B2 | 7/2017 | Johnson |
| 9,712,972 B2 | 7/2017 | Lynch |
| 9,741,191 B1 | 8/2017 | Wong |
| 9,774,994 B2 | 9/2017 | Chen |
| 9,792,567 B2 | 10/2017 | Khasis |
| 9,805,521 B1 | 10/2017 | Davidson |
| 9,817,948 B2 | 11/2017 | Swank |
| 9,826,345 B2 | 11/2017 | Haro |
| 9,838,843 B1 | 12/2017 | Bajaj |
| 9,871,865 B2 | 1/2018 | Shaashua |
| 9,878,663 B1 | 1/2018 | Kochura |
| 9,988,058 B2 | 6/2018 | Phillips |
| 10,015,353 B1 * | 7/2018 | Perez .................. H04N 1/32117 |
| 10,037,668 B1 | 7/2018 | DesGarennes |
| 10,070,261 B2 | 9/2018 | Dal Santo |
| 10,097,960 B2 | 10/2018 | Tung |
| 10,231,084 B2 | 3/2019 | Bagchi |
| 10,735,904 B2 * | 8/2020 | Dhillon ................ G01C 21/343 |
| 2004/0111195 A1 | 6/2004 | Vries |
| 2004/0193617 A1 | 9/2004 | Adler |
| 2005/0090978 A1 | 4/2005 | Bathory |
| 2005/0096009 A1 | 5/2005 | Ackley |
| 2006/0248121 A1 | 11/2006 | Cacenco et al. |
| 2007/0143013 A1 | 6/2007 | Breen |
| 2007/0173991 A1 | 7/2007 | Tenzer |
| 2007/0173994 A1 | 7/2007 | Noboru |
| 2008/0033791 A1 | 2/2008 | Jones |
| 2008/0125965 A1 | 5/2008 | Carani |
| 2008/0319602 A1 | 12/2008 | McClellan |
| 2009/0009321 A1 | 1/2009 | McClellan |
| 2009/0079555 A1 | 3/2009 | Aguirre De Carcerlonio |
| 2009/0248883 A1 | 10/2009 | Suryanarayana |
| 2009/0019357 A1 | 11/2009 | Cudich |
| 2009/0275348 A1 | 11/2009 | Weinreich |
| 2009/0309789 A1 | 12/2009 | Verechtchiagine |
| 2009/0326991 A1 | 12/2009 | Wei |
| 2010/0075648 A1 | 3/2010 | Matsuoka et al. |
| 2010/0094500 A1 | 4/2010 | Jin |
| 2010/0106603 A1 | 4/2010 | Dey |
| 2010/0203901 A1 | 8/2010 | Dinoff |
| 2010/0214068 A1 | 8/2010 | Nadkarni |
| 2010/0277307 A1 | 11/2010 | Horton |
| 2010/0280734 A1 | 11/2010 | Brinton |
| 2010/0289644 A1 | 11/2010 | Slavin |
| 2010/0306735 A1 | 12/2010 | Hoff et al. |
| 2011/0112768 A1 | 5/2011 | Doyle |
| 2011/0126168 A1 | 5/2011 | Ilyayev |
| 2011/0178811 A1 | 7/2011 | Sheridan |
| 2011/0202591 A1 | 8/2011 | Reis |
| 2011/0208797 A1 | 8/2011 | Kim |
| 2011/0238457 A1 | 9/2011 | Mason |
| 2012/0058764 A1 | 3/2012 | Kang |
| 2012/0260228 A1 | 10/2012 | Mallick |
| 2012/0330722 A1 | 12/2012 | Volpe et al. |
| 2013/0031029 A1 | 1/2013 | Davidson |
| 2013/0055253 A1 | 2/2013 | Jubran |
| 2013/0066688 A1 | 3/2013 | Pinkus |
| 2013/0090106 A1 | 4/2013 | Mathews |
| 2013/0093603 A1 | 4/2013 | Tschirhart |
| 2013/0103307 A1 | 4/2013 | Sartipi |
| 2013/0190967 A1 | 7/2013 | Hassib |
| 2013/0212130 A1 | 8/2013 | Rahnama |
| 2013/0245880 A1 | 9/2013 | McQuade |
| 2013/0254755 A1 | 9/2013 | Yousouf |
| 2013/0267253 A1 | 10/2013 | Amber |
| 2013/0289819 A1 | 10/2013 | Hassib |
| 2013/0289873 A1 | 10/2013 | Mitchell |
| 2013/0297803 A1 | 11/2013 | Hate |
| 2013/0304347 A1 | 11/2013 | Davidson |
| 2013/0340305 A1 | 12/2013 | Mobley |
| 2013/0346336 A1 | 12/2013 | Murphy |
| 2014/0026113 A1 | 1/2014 | Farooqi |
| 2014/0031073 A1 | 1/2014 | Davis |
| 2014/0057648 A1 | 2/2014 | Lyman |
| 2014/0059695 A1 | 2/2014 | Parecki |
| 2014/0062695 A1 | 3/2014 | Rosen |
| 2014/0095214 A1 | 4/2014 | Mathe et al. |
| 2014/0141767 A1 | 5/2014 | Sharma |
| 2014/0155094 A1 | 6/2014 | Zises |
| 2014/0172294 A1 | 6/2014 | Karla |

(56) References Cited

U.S. PATENT DOCUMENTS

| | | |
|---|---|---|
| 2014/0215043 A1 | 7/2014 | Ryu et al. |
| 2014/0226470 A1 | 8/2014 | Kim |
| 2014/0274115 A1 | 9/2014 | Michalson |
| 2014/0274136 A1 | 9/2014 | Edge |
| 2014/0282380 A1 | 9/2014 | Abrahams |
| 2014/0325048 A1 | 10/2014 | Benchorin |
| 2014/0325394 A1 | 10/2014 | Hamill |
| 2014/0351411 A1 | 11/2014 | Woods |
| 2014/0357295 A1* | 12/2014 | Skomra .............. H04W 12/069 455/456.1 |
| 2014/0359552 A1 | 12/2014 | Misra |
| 2014/0370911 A1 | 12/2014 | Gorgenyi |
| 2014/0380264 A1 | 12/2014 | Misra et al. |
| 2015/0012908 A1 | 1/2015 | Farooqi |
| 2015/0095355 A1 | 4/2015 | Patton |
| 2015/0106206 A1 | 4/2015 | Vengroff |
| 2015/0135163 A1 | 5/2015 | Mun |
| 2015/0149980 A1 | 5/2015 | Zhong |
| 2015/0163626 A1 | 6/2015 | Zimmer |
| 2015/0163630 A1 | 6/2015 | Hughes |
| 2015/0173037 A1 | 6/2015 | Pijl |
| 2015/0180746 A1 | 6/2015 | Day, II |
| 2015/0181016 A1 | 6/2015 | Jain |
| 2015/0245189 A1 | 8/2015 | Nalluri |
| 2015/0264527 A1 | 9/2015 | Wang |
| 2015/0271033 A1 | 9/2015 | Srivastava et al. |
| 2015/0278759 A1 | 10/2015 | Harris |
| 2015/0304175 A1 | 10/2015 | Maes |
| 2015/0350843 A1 | 12/2015 | Jensen et al. |
| 2016/0003627 A1 | 1/2016 | Bonhomme |
| 2016/0041833 A1 | 2/2016 | Standley et al. |
| 2016/0042303 A1 | 2/2016 | Medina |
| 2016/0050536 A1 | 2/2016 | You |
| 2016/0057209 A1 | 2/2016 | Parikh |
| 2016/0066141 A1 | 3/2016 | Jain |
| 2016/0071333 A1 | 3/2016 | Haidar |
| 2016/0073229 A1 | 3/2016 | Haro |
| 2016/0083697 A1 | 3/2016 | Phillips |
| 2016/0103657 A1 | 4/2016 | Zhang et al. |
| 2016/0104096 A1* | 4/2016 | Ovick ............ G06Q 10/063112 705/7.14 |
| 2016/0116596 A1 | 4/2016 | Rajala |
| 2016/0124742 A1 | 5/2016 | Rangasamy |
| 2016/0150021 A1 | 5/2016 | Britt |
| 2016/0173404 A1 | 6/2016 | Pouyllau |
| 2016/0203651 A1 | 7/2016 | Heath |
| 2016/0247330 A1 | 8/2016 | Rork |
| 2016/0284184 A1 | 9/2016 | Bean et al. |
| 2016/0286355 A1 | 9/2016 | Shur |
| 2016/0357522 A1 | 12/2016 | Wee |
| 2016/0371553 A1 | 12/2016 | Farnham, IV |
| 2017/0006135 A1 | 1/2017 | Siebel |
| 2017/0006419 A1 | 1/2017 | Rajala |
| 2017/0006430 A1 | 1/2017 | Chao |
| 2017/0111765 A1 | 4/2017 | Benegal |
| 2017/0171204 A1 | 6/2017 | Forood |
| 2017/0203633 A1 | 7/2017 | High |
| 2017/0244841 A1 | 8/2017 | Costandi |
| 2017/0270792 A1 | 9/2017 | Breton |
| 2017/0323259 A1* | 11/2017 | Gillen .................. H04W 4/021 |
| 2017/0349058 A1 | 12/2017 | Bernier |
| 2017/0359237 A1 | 12/2017 | Hao |
| 2017/0366933 A1 | 12/2017 | Chen |
| 2018/0005522 A1* | 1/2018 | Pogula .................. G08G 1/087 |
| 2018/0049001 A1 | 2/2018 | Volozh |
| 2018/0063666 A1* | 3/2018 | Broodney .............. H04W 4/70 |
| 2018/0120826 A1 | 5/2018 | Rhim |
| 2018/0199239 A1 | 7/2018 | Sabater Maroto |
| 2018/0255428 A1 | 9/2018 | Bagchi |
| 2018/0302476 A1 | 10/2018 | Perez |
| 2018/0365785 A1 | 12/2018 | Boss |
| 2018/0372503 A1 | 12/2018 | Bagchi |
| 2019/0266518 A1 | 8/2019 | Medina |
| 2019/0285426 A1* | 9/2019 | Mitchell .............. G06Q 10/047 |

FOREIGN PATENT DOCUMENTS

| | | |
|---|---|---|
| WO | 2015143416 | 9/2015 |
| WO | 2016025495 | 2/2016 |

OTHER PUBLICATIONS

Merlino et al., Mobile crowdsensing as a service: A platform for applications on top of sensing Clouds, http://www.sciencedirect.com/science/article/pii/S0167739X15002976, Mar. 2016.

International Search Report and Written Opinion from International Application No. PCT/US16/46923 dated Oct. 27, 2016.

Brouwers et al., Dwelling in the canyons: Dwelling detection in Urban Environments Using GPS, Wi-Fi, and Geolocation, Dec. 14, 2011.

Boukhechba et al.,Hybrid battery-friendly mobile solution for extracting users' visited places, Dec. 31, 2016.

Wikipedia, "Virtual Machine,"2014, pp. 1-9, downloaded from the Wayback Machine Internet Archive at ,<url>:https://web.archive.org/web/20140402003043/https://en.wikipedia.org/wiki/Virtual_machine.

Wikipedia, "Virtual Machine," 2013, pp. 1-11, downloaded from the Wayback Machine Internet Archive at <url>:https://web.archive.org/web/20130402165412/https://en.wikipedia.org/wiki/Wireless_sensor_network.

Wei-Tek Tsai et al., "Service-Oriented Cloud Computing Architecture," 2010 [retrieved on May 9, 2019], Seventh International Conference on Information Technology: New Generations, pp. 684-689, downloaded from: https://ieeexplore.ieee.org/. 2010.

B Loganayagi et al., "Creating Virtual Platform for Cloud Computing," 2010 [retrieved on May 9, 2019], 2010 IEEE International Conference on Computational Intelligence and Computing Research, pp. 1-4, downloaded from: https://ieeexplore.ieee.org 2010.

Radha Guha et al, "Impact of Web 2.0 and Cloud Computing Platform on Software Engineering," 2011 [retrieved on May 9, 2019], International Symposium on Electronic System Design, pp. 213-218, downloaded from:https//ieeexplore.ieee.org 2011.

International Search Report and Written Opinion from International Application No. PCT/US16/46924 dated Oct. 28, 2016.

"GeoFencing & Alerts", myGeoTracking, Abaqus Inc., Jul. 11, 2016, 1 page, Retrieved from: http://www.mygeotracking.com/solutions/pdf/geo_fencing_alerts.pdf.

Almomani et al., "Ubiquitous GPS vehicle tracking and management system", In Applied Electrical Engineering and Computing Technologies (AEECT), Dec. 31, 2011, IEEE Jordan Conference on, pp. 1-6.

Dennis Mbuvi, "Airtel Provide Connectivity to 2nk Sacco's Frotcom Fleet Management System", Airtel, Africa News Service, Feb. 2013.

Gerla et al., "Internet of vehicles: From intelligent grid to autonomous cars and vehicular clouds", In Internet of Things (WF-IoT), 2014 IEEE World Forum on, pp. 241-246., Dec. 31, 2014.

Rusu et al., "Localization in large-scale underground environments with RFID", 24th Canadian Conference on Electrical and Computer Engineering (CCECE), May 31, 2011.

Jin et al., "An information framework for creating a smart city through internet of things", IEEE Internet of Things Journal, 1(2), pp. 112-121, Dec. 31, 2014.

Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.

Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/DESIGN%20AND%20CONSTRUCTION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.

AT&T, Fleet management and tracking, Feb. 26, 2018., Retrieved from the Internet: https://www.business.att.com/solutions/Service/internet-of-things/vehicle-solutions/iot-connected-fleet/. (C)2018. Ear-

(56) References Cited

OTHER PUBLICATIONS liest publication date via Wayback archive:http://web.archive.org/web/20180226093503/https://www.business.att.com/solutions/Service/internet-of-things/vehicle-solutions/iot-connected-fleet/.

Frey, IoT ushers in a new era for supply chain fulfillment, Oct. 25, 2017, Retrieved from the Internet: https://internetofthingsagenda.techtarget.com/blog/IoT-Agenda/IoT-ushers-in-a-new-era-for-supply-chain-fulfillment.

International Search Report and Written Opinion from International Application No. PCTUS1838825 dated Sep. 18, 2018.

\* cited by examiner

Search Results will provide the list of IoT devices/assets who are identified as Non-Performing.

Live Tracking: Live Tracking provides a convenient way to view high level and detailed information about vehicles and places. It also provides interactions, e.g. clicking on a vehicle will expose additional details about that vehicle or by clicking on a circle expose additional details about the vehicles at the location represented by that circle.
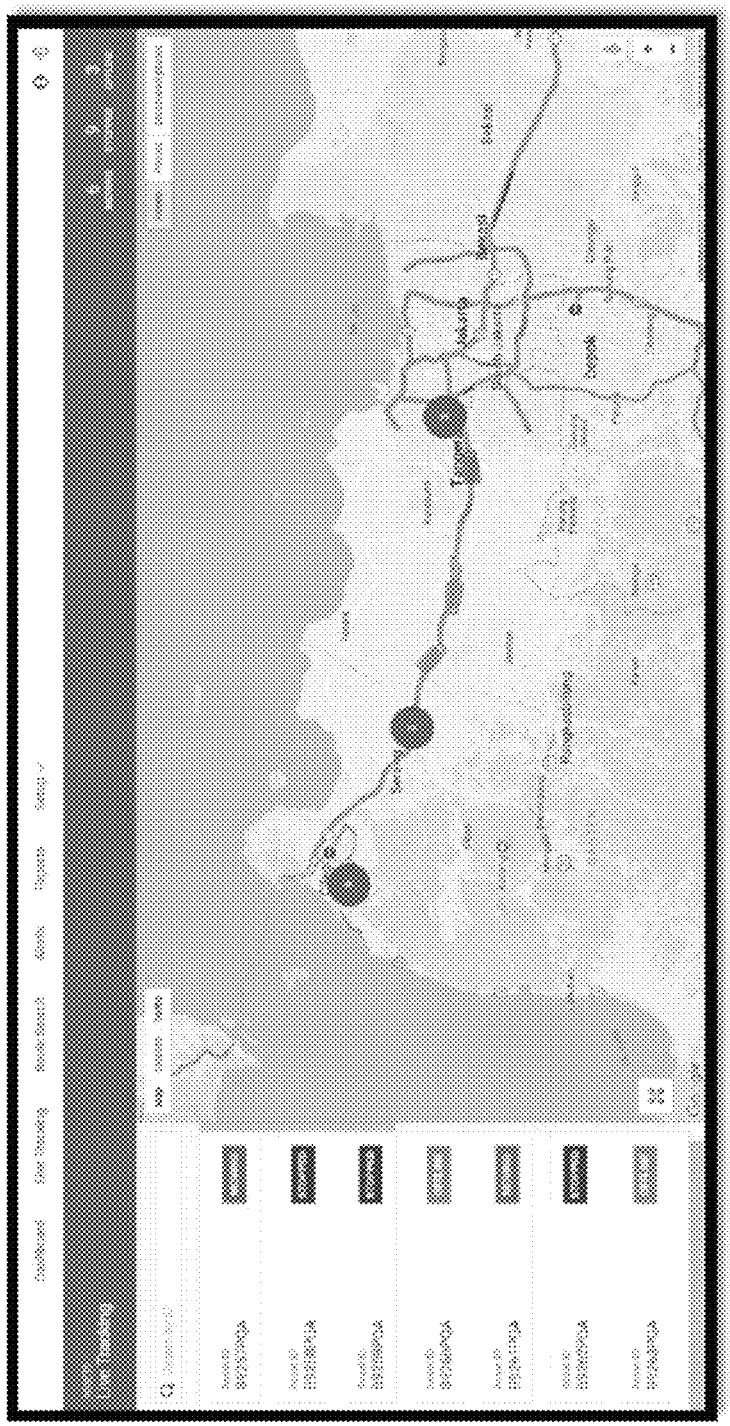
700  FIG. 7A

700"

700'''

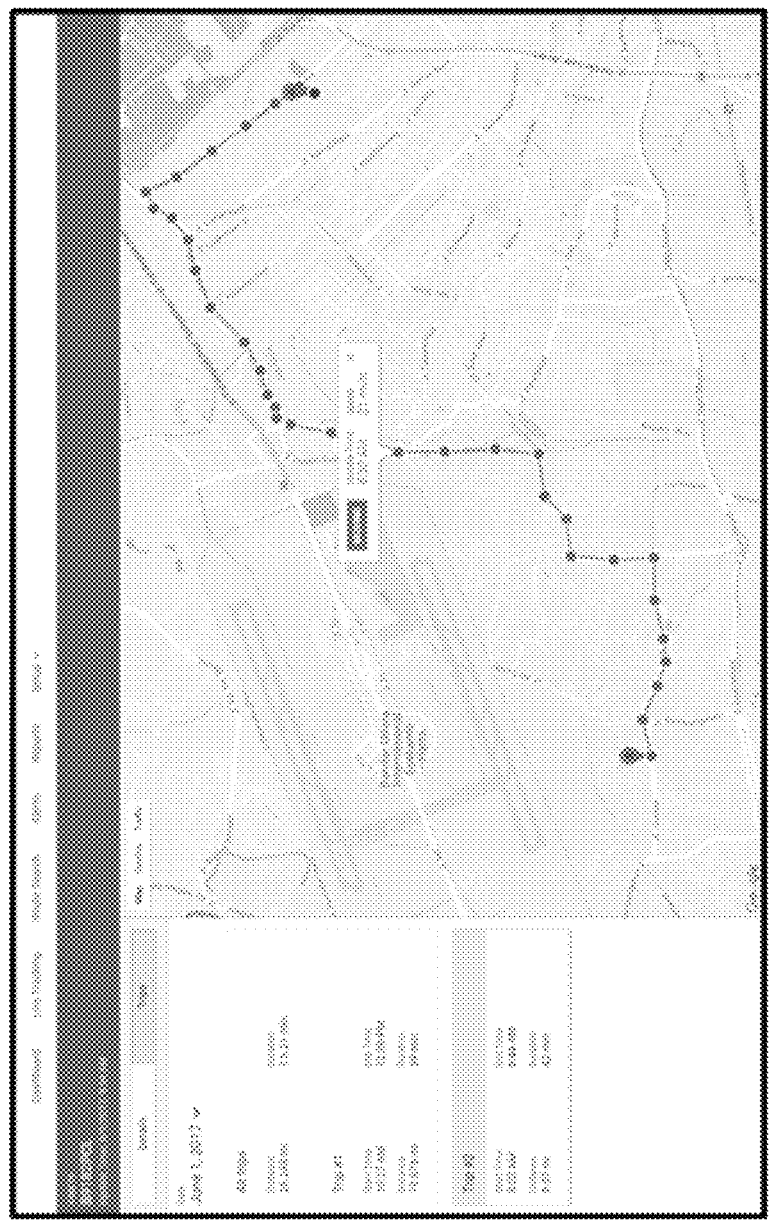
FIG. 7F 700'''''

- Trips: monthly and daily start and end time, start and end location, total distance, duration, fuel usage and efficiency for trip segments

* Driving events: count of hard driving events, hard braking, hard acceleration, left turn, right turn and speeding

- Ranking driver score: rank drivers by their driver scores, with top and bottom performers

SYSTEM AND METHOD FOR MONITORING AND SHARING LOCATION AND ACTIVITY OF DEVICES

CROSS-REFERENCE TO RELATED APPLICATIONS

This application is a continuation in part of U.S. application Ser. No. 16/014,159, entitled "SYSTEM AND METHOD FOR MONITORING LOCATION AND ACTIVITY OF DEVICES", filed on Jun. 21, 2017, which claims priority to U.S. provisional application Ser. No. 62/523,749, entitled "SYSTEM AND METHOD FOR MONITORING LOCATION AND ACTIVITY OF DEVICES", filed on Jun. 22, 2017, and is related to U.S. application Ser. No. 15/970,061, entitled "LEARNING COMMON ROUTES AND AUTOMATIC GEOFENCING IN FLEET MANAGEMENT", filed May 3, 2018, which claims priority to U.S. Provisional Application No. 62/523,748, entitled "LEARNING LOCATIONS OF INTEREST USING IoT DEVICES", filed on Jun. 22, 2017 and U.S. application Ser. No. 16/014,126, entitled "LEARNING LOCATIONS OF INTEREST USING IoT DEVICES", filed on Jun. 21, 2018, which claims priority to U.S. Provisional Application No. 62/523,748, filed Jun. 22, 2017, entitled "LEARNING LOCATIONS OF INTEREST USING IoT DEVICES", all of which are incorporated herein by reference in their entirety.

FIELD OF THE INVENTION

The embodiments described herein relate generally to communication networks and more particularly to monitoring and sharing location and activity of devices that are capable of moving, connected to a wireless communications network, such as a cellular network, and that share other characteristics, such as belonging to a commercial fleet of vehicles.

BACKGROUND

In many Internet-of-Things (IoT)/Machine-to-Machine (M2M) solutions, particularly running on moving machines, for example, vehicles, it may be useful to the fleet operator to track not only the vehicles, but who is driving, what job they are working on and/or the location of the vehicle and share the information obtained in so doing with other users who may be interested in obtaining such information but are not provisioned for monitoring.

SUMMARY

In one example embodiment, a computer implemented method for providing job status information for at least one IoT device is disclosed. The method includes receiving location information of the at least one IoT device; receiving job assignment information for the at least one IoT device; evaluating the location information to determine the job status for the at least one IoT device based on a specified condition; and sharing the job status information via a user interface.

In another example embodiment, a system for providing job status information for at least one IoT device is disclosed. The system includes at least one IoT device, a job management platform (JMP) and a user interface, wherein the job management platform further comprises a storage database, wherein the storage database receives location information of the at least one IoT device and job assignment information for the at least one IoT device; and an analytics engine, wherein the analytics engine evaluates the location information to determine the job status for the at least one IoT device based on a specified condition; wherein the job management platform shares the job status information via a user interface.

In an embodiment, a non-transitory computer-readable medium is disclosed. The non-transitory computer-readable medium having executable instructions stored therein that, when executed, cause one or more processors corresponding to a system having a database and a user interface to perform operations including receiving location information of the at least one IoT device; receiving job assignment information for the at least one IoT device; evaluating the location information to determine the job status for the at least one IoT device based on a specified condition; and sharing the job status information via a user interface.

BRIEF DESCRIPTION OF THE DRAWINGS

FIGS. 4B-C illustrate exemplary user interfaces for using the system and method for sharing location and activity of devices according to an embodiment described herein.

FIGS. 7A-H illustrate exemplary user interfaces for using the system and method for monitoring location and activity of devices according to an embodiment described herein.

FIG. 8A-C illustrate exemplary user interfaces for using the system and method for monitoring location and activity of devices according to an embodiment described herein.

DETAILED DESCRIPTION

Figure 1:
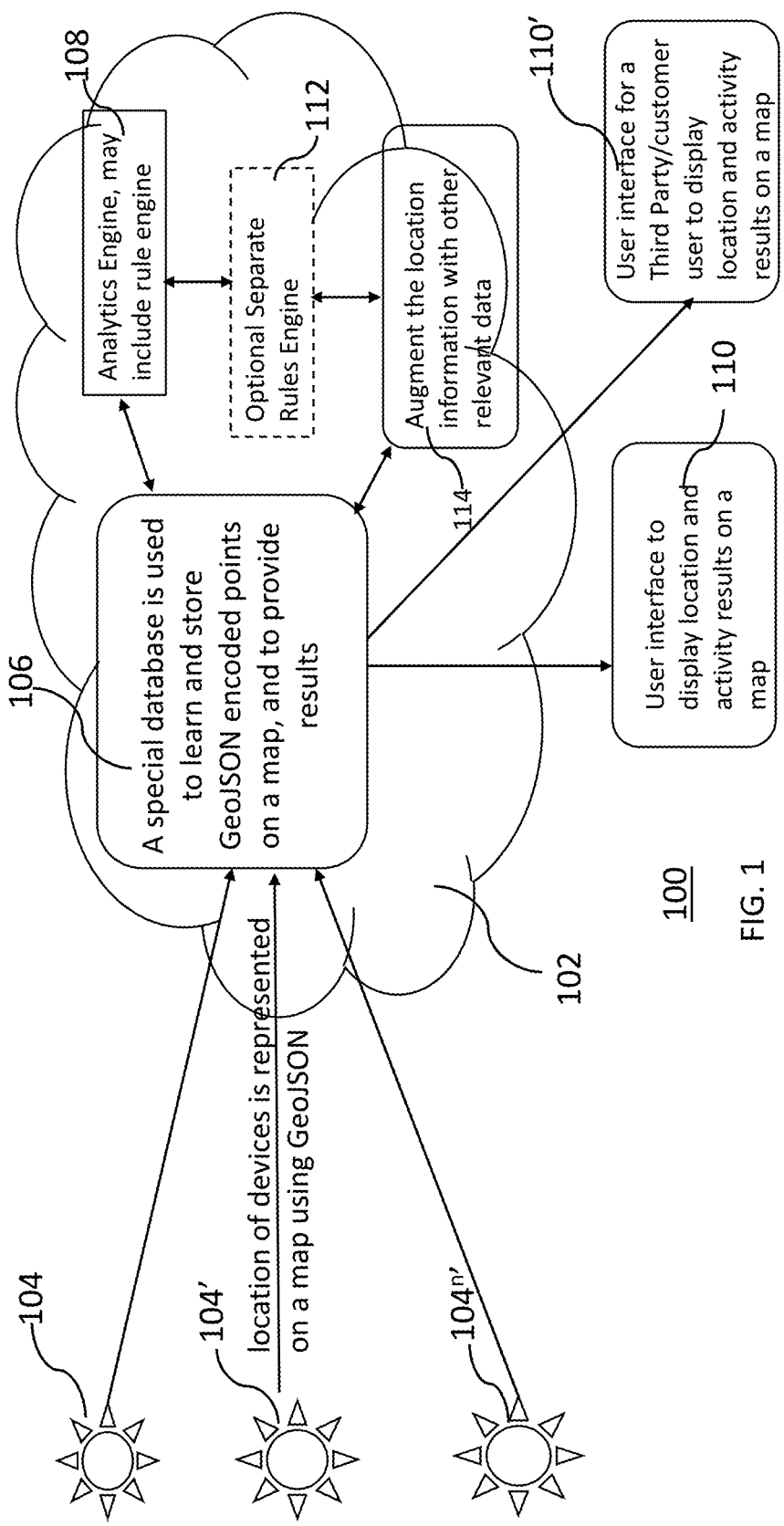
FIG. 1 is an overview diagram for the method and system for monitoring and sharing location and activity of devices according to an embodiment described herein.

The embodiments described herein relate generally to communication networks, which may be cellular and/or wireless networks and more particularly to monitoring location and activity of IoT devices or mobile devices that are capable of moving, connected to a wireless communications network, such as a cellular network, and that share other characteristics, for example, vehicles belonging to a commercial fleet of vehicles, also known as assets in which IoT devices or mobile devices capable of communication are installed. The IoT devices or the mobile devices have the ability to transmit data over the internet. The transmission may also take place, for instance, through a blue-tooth connection to one's phone which uses cellular connectivity. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown but is to be accorded the widest scope consistent with the principles and features described herein.

Many Internet-of-Things (IoT)/Machine-to-Machine (M2M) solutions, particularly running on moving machines or assets, for example, vehicles, it may be useful to the fleet operator to track not only the vehicles, but also who is driving, how they are driving, what job they are working on, when they are expected to complete the job, and/or the location of the vehicle. Operators of the mobile devices, for example, driver of the vehicles performing jobs may not have access to cellular connectivity throughout their job performance, in which case status of the job may be tracked or monitored using location of the vehicle. The location of the vehicle may provide information whether the vehicle is at a depot, at a pickup location, in transit or at a drop off location and based on this information, status of the assigned job may be deduced.

A job may be defined as an activity of taking a particular load from one location to another location or may include pick up from multiple locations and deliveries to multiple locations using one or more vehicles. Once a job is received, the information regarding the job is entered into the monitoring system including a starting point of the job, an end point of the job, or multiple pickup and drop-off points during a particular job/journey, vehicle information for the vehicle assigned to a particular job, driver information for the driver assigned to a particular job, expected start time of the job, expected end time of the job, information of the customer providing the job, etc. For example, the display on the user interface may show any or all of: driver A is driving vehicle B at time XX, performing job Y job, and the current job status is Z. In addition, a job may also include automatic jobs. For example, based on previous job history data, the claimed invention can automatically learn what type of job the driver is doing, where they are going to, etc. In other words, using device history and/or job history and data analytics to learn job behavior also known as job status.

The system and method for monitoring location and activity of the devices connected to the cellular network described herein can track the status of a job, for example, not started, waiting to be started, in progress, completed, etc.; overall on-time completion rate, for example, % of jobs completed on-time versus % of jobs not completed on-time; job completion performance of drivers, for example, on-time completion rate; driving behavior of drivers, for example, driver score where higher score means better driving behavior and may include criteria such as but not limited to excessive braking, acceleration, hard left or right turns etc. The system and method may also monitor completion rate of jobs for different customers and by different drivers. The fleet operators, also known as the subscribers, may also provide access to their customers for whom the jobs are being performed so that they can see the vehicles that are performing their jobs and also know the expected time, date etc. of completion.

The system and method may additionally or alternatively set up alerts so that customers may know when the jobs are assigned and/or the information of the device performing the job, when the assigned job has started, for example, the vehicle has picked up the load; when the assigned job is about to be completed, for example, the vehicle is near the delivery location; and when the job is completed, for example, the vehicle has delivered the load.

The system and method may additionally or alternatively, automatically assign drivers & vehicles to jobs based on availability, size of load to match with the vehicle, proximity of the vehicle to pick up location, driver behavior, driver score etc.

The system and method may additionally or alternatively, provide the expected location of the vehicle at a particular time of the day of the week, and/or on a specific date by using analytics. This may be determined by observing vehicle data patterns based on various parameters including but not limited to: day of week and time of the day, day of the month etc. and may take into account holidays, or other major natural disaster events such as severe weather events.

Generally, customers would have to manually look at a map view to determine the location of each vehicle from a fleet of vehicles at a given time of the day. This process is a tedious and cumbersome activity that may require either phone calls to or from the drivers of the vehicles, and/or check ins/signing in by the drivers and/or end customers, e.g., recipients of the deliveries. The fleet managers may have to sit in front of a computer to determine the location of each vehicle from a fleet of vehicles at a given time of the day, especially with larger fleets.

The system and method described herein provides users, e.g., fleet operators, with a unique visualization of their fleets of assets/vehicles. The system may provide the user with a report with an overview of their vehicle's locations in relation to their saved destinations/places. The user may be provided with a summary of how many vehicles are in each saved location or are in transit. Thus, the key aspect of the method and system described herein is to display the locations of vehicles in a unique and summarized fashion that gives users an immediate and detailed view of the vehicle status belonging to a particular fleet.

The system and method described herein also helps the fleet manager to determine if any of his vehicles or drivers have issues related to vehicle performance, fuel level, traffic conditions etc. and/or if the drivers of the vehicles are not completing deliveries as expected.

Additionally, the solution is provided as both, a web application and a mobile application, and hence allows the fleet manager to view the state of individual vehicles belonging to a particular fleet without calling drivers or without drivers physically having to check in or report from various job locations, and without sitting in front of a computer monitoring the individual vehicles in the fleet.

In an embodiment, the system and method described herein may further allow job management user to generate share link for a specific IoT device from a job status interface for another user such as business consumers/customers, also called as a third-party user, who otherwise may not have access to the information due to various reasons, e.g., no business relationship with the job management platform (JMP) provider, or no permanent relationship with the job management entity or the primary user. The third-party user may be implicitly authorized to access the data for the limited purpose, limited time and limited number of devices. The link may be shared with any user who is interested in status of the job on demand, at a regular time interval or at a pre-determined time, even-though they are not provisioned in the system. On accessing the share link, the third-party user may view live location information, job assignment information and job status of an IoT device via job status Interface as and when needed. The share link may be inbuilt with a hidden expiration time and hence will not be accessible once expired.

In another embodiment, the system and method described herein may further allow job management platform (JMP) user such as administrator who manages the job management platform or a business user may be interested to get more insights about how his assets are performing on the field on demand, at a regular time interval or at a pre-determined time. This feature helps him to get an idea of job In-efficiency of the assets which comes under his portfolio, for example, hierarchical view of queries/reports for job.

An asset may be described as a moving machine or mobile equipment, for example, a vehicle or other equipment with IoT device (a device) capable of communication installed in it, where the location, activity, efficiency of the asset may be monitored with the help of IoT device that is capable of communicating, due to presence of a communication product such as SIM installed in the device, with the job management platform (JMP).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an overview diagram for the method and system for monitoring location and activity of devices according to an embodiment described herein. FIG. 1 illustrates system configuration 100 including mobile devices 104, 104' . . . 104n', a data processing system 102 including a storage database 106, analytics engine 108, optional rules engine 112, and a user interface 110. A system for monitoring location and activity of devices includes a storage database 106, wherein the storage database 106 receives location information from the mobile device 104 and job assignment information for the mobile devices 104; an analytics engine 108, wherein the analytics engine 108 evaluates the location information to determine the job status for the at least one IoT device or a mobile device based on a specified condition.

In an embodiment, the rules engine 112 may be provided as a part of the analytics engine 108 or as a separate rules engine as illustrated by optional separate rules engine 112. The determination of job status based on conditions specified may include determining if the location of the vehicle is within a radius of proximity from any one or more of: start location of route for the job, destination location for the route for the job, one or more pick-up and drop-off points, location point along the route for the job.

For example, once a job is received, it is entered into the system as starting point/location, end point/location, or multiple pickup and drop-off points/locations, vehicle assigned to job, driver assigned to job, expected start time and expected end time and customer information including name and address of the customer. The method and system then track the location, e.g., latitude/longitude, street address etc., of the assigned device along with other device data including device activity. The method and system thus track the status of the assigned jobs based on the location of the device, for example, job not started, job in progress, or job completed. For example, if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". The system and method may use other naming system and criteria to determine the job status for the IoT device or the mobile device as determined by the application provider and/or fleet operator.

Additionally or alternatively, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Location based data analytics may be used to automate the process for the repeat jobs based on data analytics and machine learning. Learned locations and/or learned routes enable the system to automatically detect a location pattern for a particular job and to create and use the automatic geofences created around learned locations, e.g., pick-up & drop-off locations, or geofences created around learned routes, e.g., based on starting location and destination location, to automate the creation and execution of a job.

In an embodiment, the location patterns may be based on learning new locations of interest and using the learned locations of interest to determine geofences for starting location of the trip, destination location for a trip, multiple destinations, e.g., pick-up and drop-off locations, for a trip, etc. This location detection and learning new location using IoT devices is described in the related U.S. patent application Ser. No. 16/014,126, entitled, "LEARNING LOCATIONS OF INTEREST USING IoT DEVICES", filed Jun. 21, 2018 which is incorporated herein by reference in its entirety.

Additionally or alternatively, the location patterns may be based on learning routes and using the learned routes to determine geofences for the routes to be taken by the vehicle to complete the assigned job based on starting location of the trip, destination location for a trip, multiple destinations, e.g., pick-up and drop-off locations, for a trip, etc. This learning routes and automatic geofencing using IoT devices is described in the related U.S. patent application Ser. No. 15/970,061, entitled "LEARNING COMMON ROUTES AND AUTOMATIC GEOFENCING IN FLEET MAN- AGEMENT", filed May 3, 2018 which is incorporated herein by reference in its entirety.

The method and system may also track the overall on-time completion rate (what % completed on-time versus not), job completion performance of drivers (on-time completion rate) and driver behavior including excessive braking, acceleration, hard left or right turns. The driver behavior may be analyzed to give a driver score, for example, higher score may mean better driving behavior. Alternatively or additionally, the method and system may also track completion rate of jobs for different drivers and/or for different customers.

The mobile devices 104, 104', . . . 104''' or an IoT device may include IoT devices capable of communication, for example, vehicles connected to the cellular network or cellular-enabled devices via SIMs that are installed in the mobile devices as either integrated in the vehicle itself or removably installed in the vehicle on each of the fleet vehicle. These communication devices could be devices using a radio module and Wi-Fi, or any other wireless communication technology that are capable of transmitting relevant vehicle data to database 106 and/or the data processing system 102 of the monitoring system. In an embodiment, the devices, e.g., vehicles, may have monitoring devices installed in them, that are also capable of communication via SIMs that are installed in them. These monitoring devices may also be devices using a radio module and or any other wireless communication technology that are capable of transmitting relevant vehicle/monitoring data to database 106 and/or the data processing system 102 of the monitoring system.

Moving devices or IoT devices either directly or via monitoring devices installed in them send various data to a database as they perform their jobs. This data may be processed further by extracting information for relevant fields using application programming interface (API) keys to read data contained in specific data fields.

In an embodiment, the data may be containerized and stored based on a subscription identifier. The data is accessed through APIs using API keys and user authentication to securely transmit the data. Management of data received from these devices and access to application specific data to be used by specific applications is described in a related U.S. patent application Ser. No. 14/207,378, entitled, "MANAGEMENT OF DATA FEEDS FROM DEVICES AND PUBLISHING AND CONSUMPTION OF DATA" filed Mar. 12, 2014 and is herein incorporated by reference in its entirety.

In another embodiment, device data sent directly from the devices to the storage database may be used, where the data may be accessed through APIs using API keys and user authentication to securely transmit the data.

In yet another embodiment, the device data is sent to a data processor, e.g, an adapter, where it is processed and then sent to the storage database to be used by the analytics engine or the data processing system.

Various data are collected from the moving devices either directly or via monitoring devices installed in them, as they perform their jobs. The data may be accessed through APIs using API keys and user authentication to securely transmit.

The system configuration 100 may include an instance of a client application with a user interface 110 hosted thereon, for example, a desktop fleet application provided through a web-based portal used by the fleet manager to manage fleet vehicles, and/or fleet application operating on mobile devices, such as smartphones, used by the fleet manager to manage fleet vehicles or by vehicle drivers to access the information on the go, anywhere, any time.

The system and method described herein may further allow job management user to generate share link for a specific IoT device from a job status interface 110 for another user such as business consumers/customers, also called as a third-party user, who otherwise may not have access to the information due to various reasons, e.g., no business relationship with the job management platform (JMP) provider, or no permanent relationship with the job management entity or the primary user via another job status interface 110'. The link may be shared on demand, at a regular time interval or at a pre-determined time with any user who is interested in status of the job even-though they are not provisioned in the system. On accessing the share link, the third-party user will get a view via job status Interface 110' to receive live location information, job assignment information and job status of an IoT device. For example, in an embodiment, the share link may be inbuilt with a hidden expiration time and hence may not be accessible once expired, illustrated by FIGS. 3A-D, and described in detail in the descriptions accompanying FIGS. 3A-D.

Figure 4A:
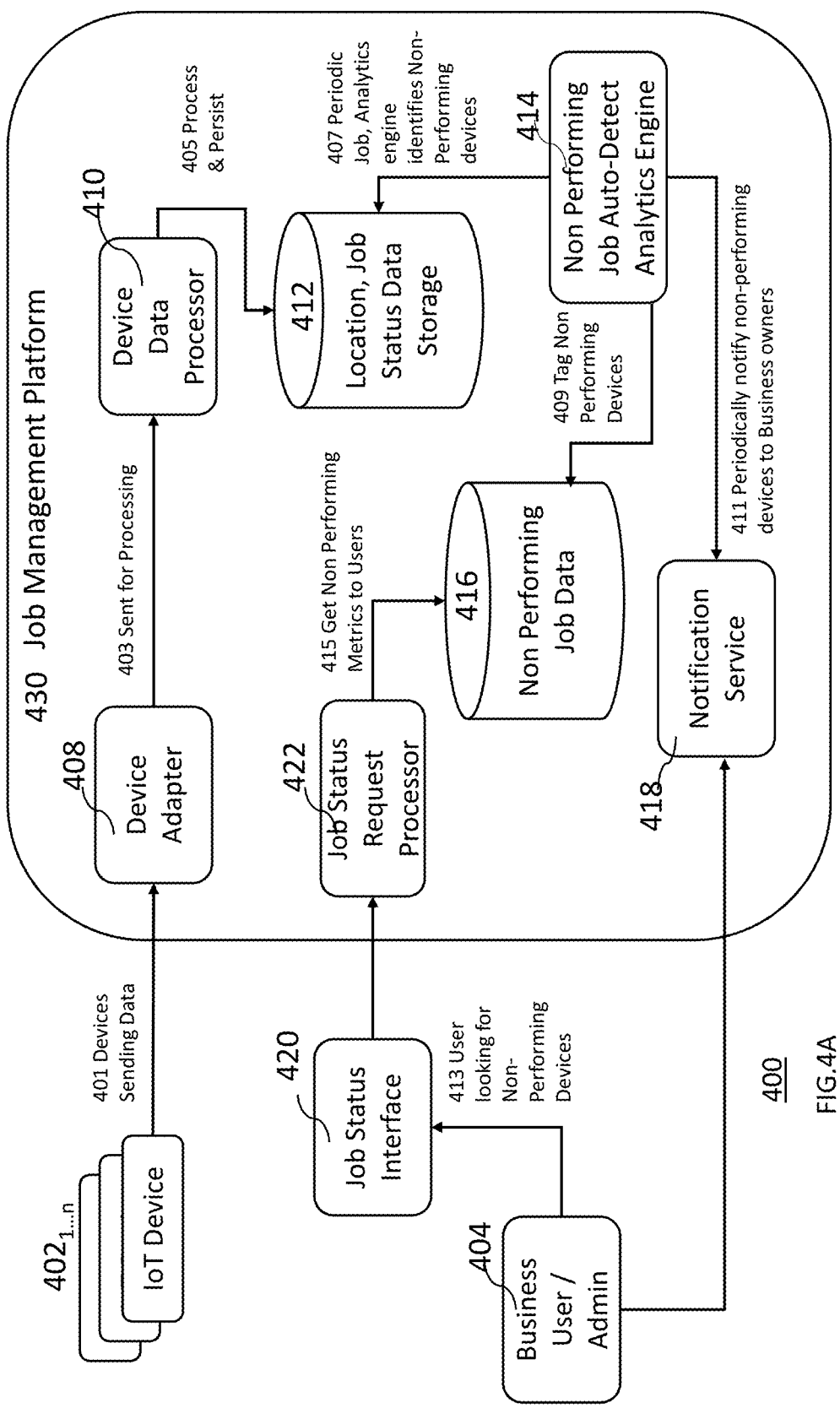
FIG. 4A is an exemplary process flow for the method and system for sharing location and activity of devices according to one or more embodiments described herein.
Figure 4B:
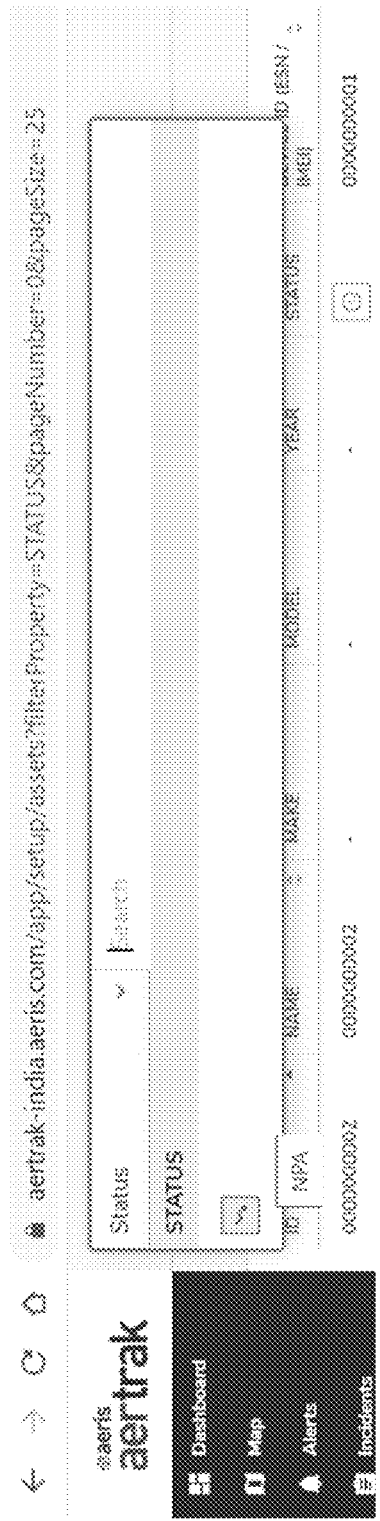
Figure 4C:
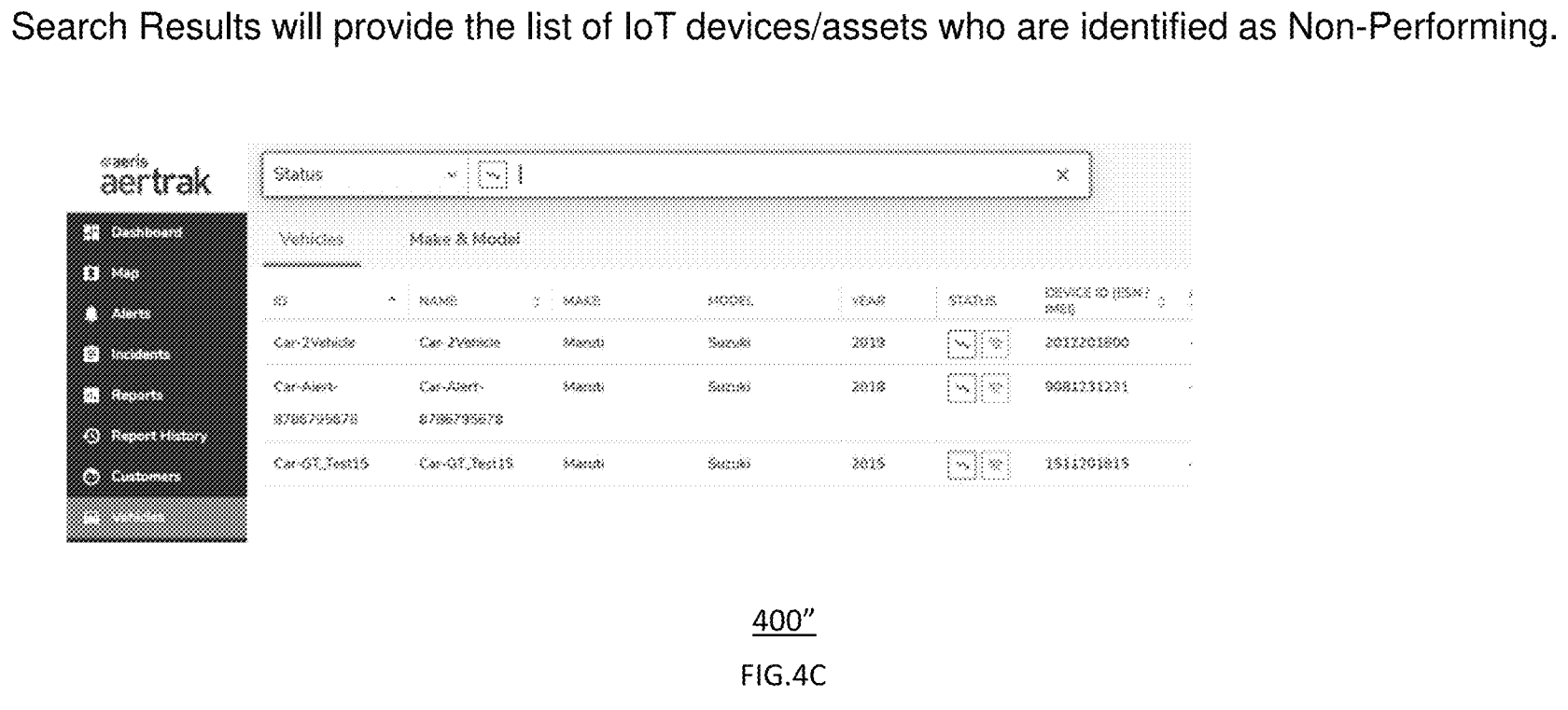
Figure 5A:
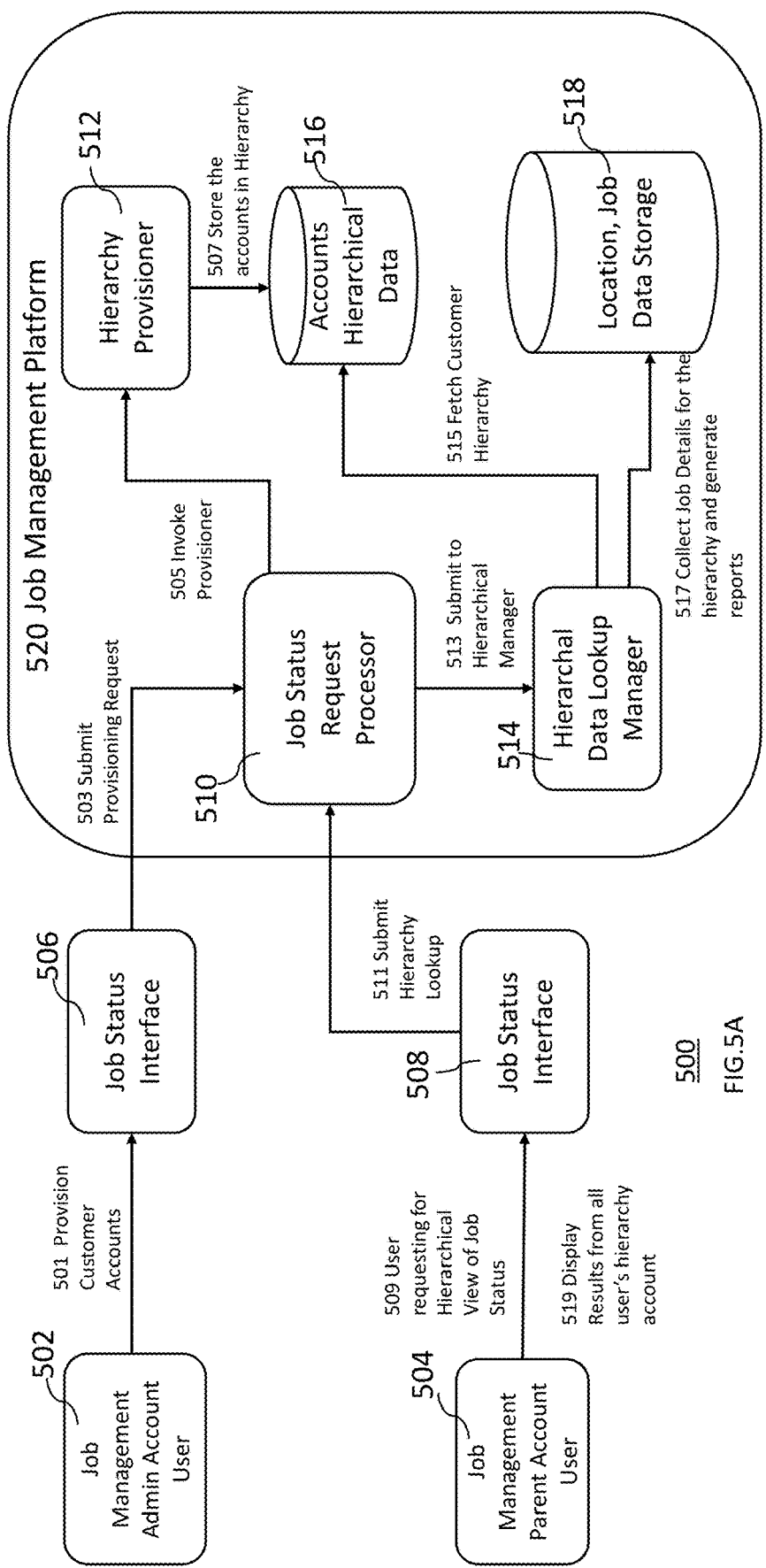
FIG. 5A is an exemplary process flow for the method and system for sharing location and activity of devices according to one or more embodiments described herein.
Figure 5B:
FIG. 5B illustrates an exemplary user interface showing hierarchical view of parent and child accounts based on geographical location according to an embodiment described herein.
Figure 5C:
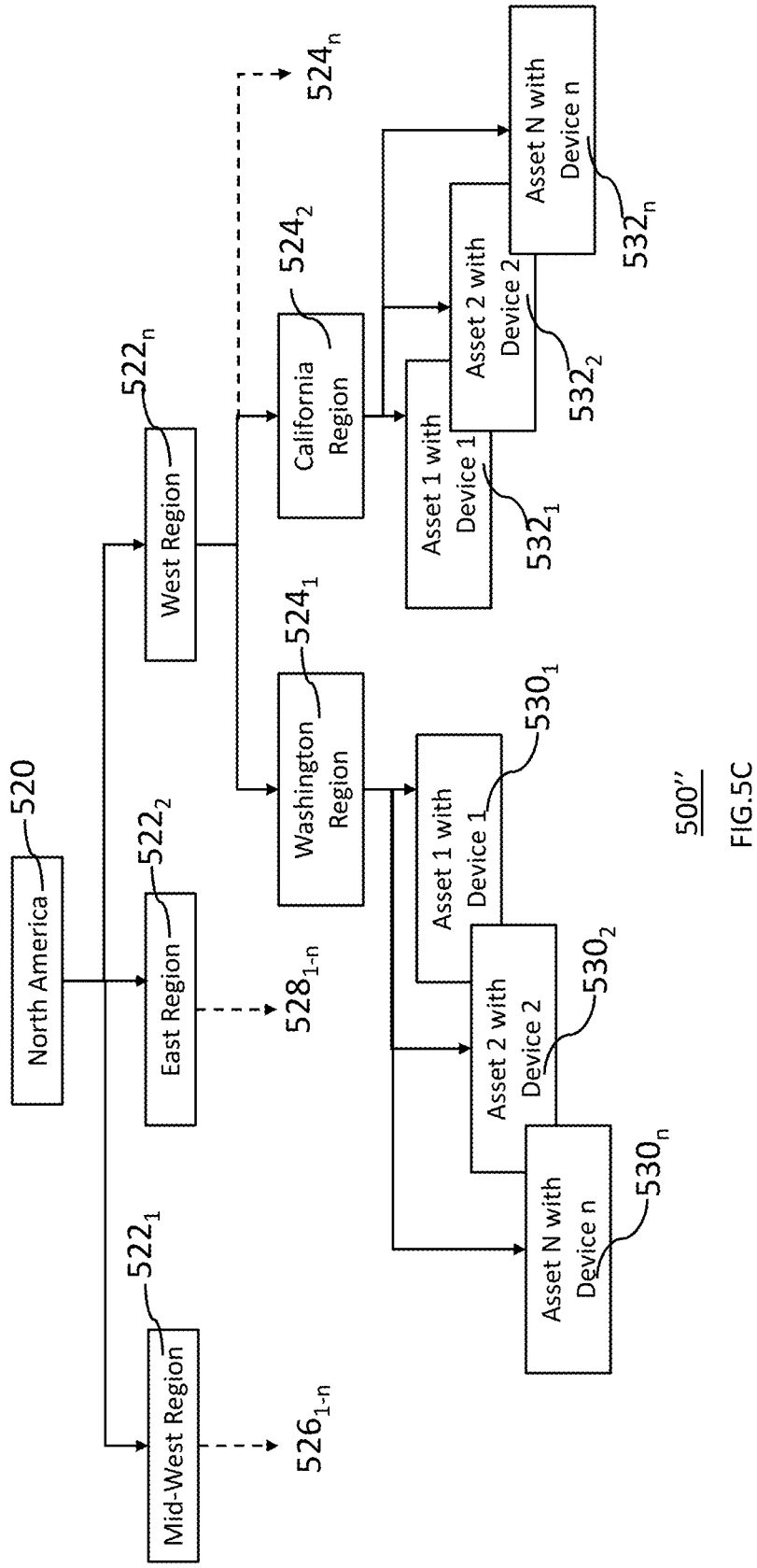
FIG. 5C illustrates an exemplary hierarchical view of parent and child accounts based on geographical location according to an embodiment described herein.

Additional exemplary embodiments of the system and method described herein may allow sharing job status information with business users who have an established relationship such employer-employee, manufacturer-dealer, fleet provider-fleet user with the primary user (employer, manufacturer, fleet provider etc.) who in turn has a direct relationship with the job management platform (JMP) provider are illustrated by FIGS. 4A-C and 5A-C and described in detail in the descriptions accompanying FIGS. 4A-C and 5A-C. For example, FIG. 4A-C illustrate an exemplary embodiment, the system and method described wherein may further allow job management user who owns the job management platform to share the location/job status with their business consumers on demand, at a regular time interval or at a pre-determined time. Similarly, for example, FIGS. 5A-C illustrate an exemplary embodiment, the system and method described wherein may further allow job management user who manages the job management platform may be interested to get more insights about how his assets are performing on the field.

The learning or storage database 106 may be a special database, also known as a location aware database which is used to learn and store GeoJSON encoded points on a map, and to provide results, for example, an instance offered by a provider of cloud computing services. The data is gathered by the learning or storage database 106. The gathered data may include route information along with the device records, for example, device identifier, start location of the route, destination location for the route, location of the device at time t=0 . . . t=n, time of the day for the travel, day of the week for the travel, time taken for or duration of the travel, distance covered during the travel, etc. The system may further involve usage of a computer to determine proximity to a location of interest, e.g., starting location, ending location, locations on route etc., among a vast number of locations on a map using radius of proximity.

Once a job is received, it is entered into the system as starting point, end point, or multiple pickup and drop-off points, vehicle assigned to job, driver assigned to job, expected start time and expected end time and customer information including name and address of the customer. This data is also saved to a database which may be the same as a database storing gathered device information or different from the database storing gathered device information, described above.

The algorithm may first scan through the device records and arrange them sequentially with respect to time. It may then detect times and places the device has visited over time during performance of a job by the analytics engine 108. The algorithm may then make a decision about job status of the device based on location data gathered and transmitted by the device within the learning/storage database 106. For example, the vehicle has picked up the load, when the vehicle leaves the location from where the load is supposed to be picked up; the assigned job is about to be completed when the vehicle is near the delivery location; or the job is completed, when the vehicle has reached and/or left the delivery location. This may be done real-time or near real-time.

In an embodiment, the system and method may additionally or alternatively set up alerts so that customers may know when the jobs are assigned and/or the information of the device performing the job, when the assigned job has started, for example, the vehicle has picked up the load; when the assigned job is about to be completed, for example, the vehicle is near the delivery location; and when the job is completed, for example, the vehicle has delivered the load.

This data may be augmented with other relevant data by the data augmentation engine 114, for example, the received location information may be augmented with more information like association of the detected location from the gathered device data with the known address of a business or activity of a certain type (e.g., restaurant, monument or place of worship). This information may either be entered by the fleet operator or derived from map services provided by third-parties. This data augmentation allows the system and method to associate an 'intent' when drivers are seen approaching a known place. This augmented information may then be presented to the fleet operator to enter addresses of start and end locations using pop-up list of addresses. A fleet operator may be a person who is responsible for managing fleets. Each account may have one or more fleets connected to it.

The rules engine 112 of the data processing system 102 may determine proximity of the locations derived from the device location data to the start and end locations and/or the locations on the route of the job by using a radius of proximity that may be defined by the user or provided to the system. If the received location data is within the radius of proximity of an already defined place, it is assumed that the vehicle is moving as planned. Otherwise, the location date is treated as a diversion from the job route and may be added to the storage database 106 and an alert may be issued.

The algorithm may be designed to work within the SaaS (Software as a Service) model where one physical database may be maintained for all accounts and that data used on an aggregate basis to assist the rules engine 112 in determining significance of visited places, but actual data of devices identified to each account is kept separate for each account and processed and displayed exclusively for that account within the database.

The actual process of monitoring location and activity of devices may be triggered by a streaming API that delivers and/or analyzes a trip as soon as it begins and stores the locations the device travels, as well as the stop locations or end locations during the trip. An alternate way to trigger the monitoring of location and activity of devices process may be through using a script that runs at periodic intervals, for example, once a day, once a week etc. Alternatively, the monitoring of location and activity of devices process may be defined as an ongoing process, collecting device data in real time or near-real time.

The device locations that are detected within a proximity radius of, e.g., 0.1 mile or 0.2 miles, from a place on the job route or starting and/or ending locations, or multiple pick-up and drop-off locations for a particular job may be determined by the system as the location at that point. For example, if the location of the vehicle is detected to be 0.1 mile from the starting point of the job route, the vehicle may be determined to be at the starting point of the job route. The radius of proximity may thus define the granularity of the location of the device on a map. Several such device locations with different radii of separation—all of which may be derived from the base collection with a predetermined granularity, may be stored in database 108 and presented to the user via user interface 118. Although 0.1 miles, 0.2 miles are used as examples, different radii of proximity may be used as defined by the system and/or chosen or determined by the user.

Figure 2A:
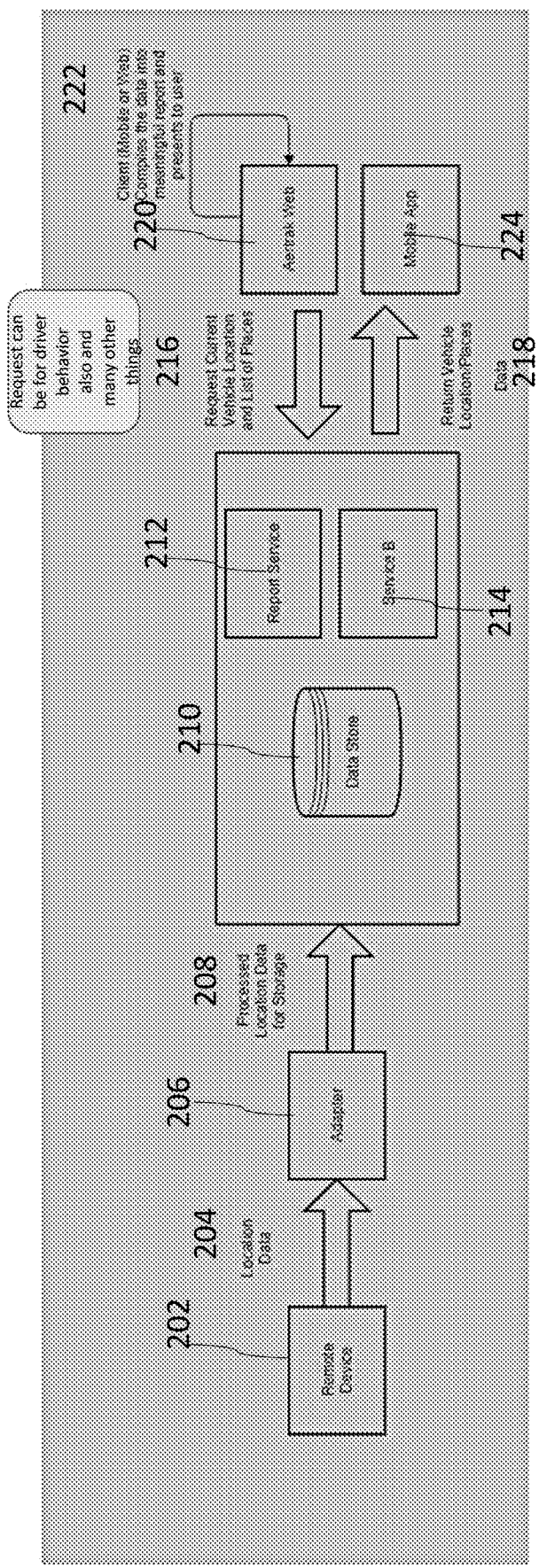
FIG. 2A illustrates an exemplary system and process flow for the system and method for monitoring and sharing location and activity of devices according to an embodiment described herein.

FIG. 2A is an example configuration and process flow for the method and system for monitoring location and activity of devices according to an embodiment described herein. In an embodiment, the system for providing job status information for one or more IoT devices includes a storage database 210, which may be a location-aware database. The storage database receives location information from the at least one IoT device 202 via steps 204 and 208 through adapter 206. Adapter 206 is a data processor that processes location data by analyzing and sorting the received device data. The fleet adapter 206 may be a network endpoint component which understands the device protocol, e.g., TCP, UDP, interprets the received data and sends it to the storage database 210 which may be a physical database or may be a cloud database. The storage database also receives job assignment information for the at least one IoT device 202. The system further includes an analytics engine, also known service B 210, which is a job service that evaluates location info to determine job status, and a report service 212 which generates reports by compiling the relevant information retrieved from the one or more databases. The analytics engine 210 evaluates the location information to determine the job status for the at least one IoT device based on a specified condition. The determination of job status based on conditions specified may include determining if the location of the vehicle is within a radius of proximity from any one or more of: start location of route for the job, destination location for the route for the job, one or more pick-up and drop-off points, location point along the route for the job, e.g., if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". This information may be accessed by web based application 220 via step 216 or mobile application 224 via step 218. Mobile or Web client may compile the data into meaningful report and present it to the user via step 222.

The main logic for this feature is handled on the client which may be a mobile application or a web application. The logic is as follows: Current location for desired vehicles, which may be specific vehicles or all vehicles belonging to a particular fleet, is retrieved from the data store. This may be done by retrieving data from the server or a data storage, which may be a physical data storage or may be cloud based data storage, by using representational state transfer (REST) webservices that will in turn obtain data from microservice via message queues. The microservices are responsible for retrieving data from a data store. For example, a client may request data from server through the client facing REST services using message: GET ASSET Location (api/fleet/assets), and the server may provide data using the response including AssetID, Latitude and longitude. This is passed back as a JSON OBJECT, as shown below.

```
{
    "sequenceNumber": 29065,
    "updateTime": 1529433160,
    "timeOfFix": 1529433160,
    "latitude": 11.746055,
    "longitude": 11.9934163,
    "altitude": 39553,
    "speed": 0,
    "heading": 8,
    "satellites": 12,
    "carrier": 20,
    "rssi": -87,
    "hdop": 0.8,
    "inputs": 3,
    "fixStatus": 2,
    "eventType": 10,
    "devicePowerVoltage": 13,
    "assetState": on
},
{
    "sequenceNumber": 29064,
    "updateTime": 1529433100,
    "timeOfFix": 1529433100,
    "latitude": 11.74604559999999,
    "longitude": 11.9934183,
    "altitude": 39606,
    "speed": 0,
    ...
```

New data may be posted or existing data may be updated into the data storage via the adapter 206 as described above. Since the use of REST webservices is based on API, no user interface and/or human interaction may be involved in retrieving data from the server. The REST API services retrieve data through microservices. Microservices may help retrieve different information via smaller queries, generally performing a single function, from NO-SQL data structures or distributed databases, e.g., Cassandra, MongoDB etc. This retrieved information may then be compiled in a report format, based on user requests.

All data, including geofence, for places associated with the fleet are retrieved from the data store using REST web services via microservices as described above. The received device data e.g., vehicle locations are compared to the geofence data to determine the following: (a) Count of vehicles associated with a given place; (b) Counts of vehicles with no last known location; (c) Counts of vehicles not in a specific location (in transit); (d) When the vehicles count doesn't match with the number of vehicles in the fleet, there will be "**" next to the total count of vehicles on both top and bottom of the status summary. Once the results are obtained, they may be compiled in a desired format and rendered to the mobile and/or web interface as desired by the user.

Additionally or alternatively, the method and system may also include data analytics based on historical data for a particular job based on location parameters associated with that job, e.g., starting locations, destination location, pick-up and drop-off locations etc., and other conditions, e.g., traffic conditions based on day of the week, time of the day etc., may predict expected location of the vehicle at a particular time and may highlight anomalies to the user.

For example, once a job is received, it is entered into system as starting point, end point, or multiple pickup and drop-off points, vehicle assigned to job, driver assigned to job, expected start time and expected end time and customer information including name and address of the customer. The method and system then tracks the location of the assigned device along with other device data including device activity. The method and system thus tracks the status of the assigned jobs based on the location of the device, for example, job not started, job in progress, or job completed. For example, if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". The system and method may use other naming system and criteria to determine the job status for the IoT device.

Location based data analytics may be used to automate the process for the repeat jobs based on data analytics and machine learning. For example, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Learned locations and/or learned routes enable the system to automatically detect a location pattern for a particular job and to create and use the automatic geofences created around learned locations, e.g., pick-up & drop-off locations, or geofences created around learned routes, e.g., based on starting location and destination location, to automate the creation and execution of a job.

In an embodiment, the location patterns may be based on learning new locations of interest and using the learned locations of interest to determine geofences for starting location of the trip, destination location for a trip, multiple destinations, e.g., pick-up and drop-off locations, for a trip, etc. This location detection and learning new location using IoT devices is described in the related U.S. patent application Ser. No. 16/014,126, entitled, "LEARNING LOCATIONS OF INTEREST USING IoT DEVICES", filed Jun. 21, 2018 which is incorporated herein by reference in its entirety.

Additionally or alternatively, the location patterns may be based on learning routes and using the learned routes to determine geofences for the routes to be taken by the vehicle to complete the assigned job based on starting location of the trip, destination location for a trip, multiple destinations, e.g., pick-up and drop-off locations, for a trip, etc. This learning routes and automatic geofencing using IoT devices is described in the related U.S. patent application Ser. No. 15/970,061, entitled "LEARNING COMMON ROUTES AND AUTOMATIC GEOFENCING IN FLEET MANAGEMENT", filed May 3, 2018 which is incorporated herein by reference in its entirety.

The method and system may also track the overall on-time completion rate (what % completed on-time versus not), job completion performance of drivers (on-time completion rate) and driver behavior including excessive braking, acceleration, hard left or right turns. The driver behavior may be analyzed to give a driver score, for example, higher score may mean better driving behavior. Alternatively or additionally, the method and system may also track completion rate of jobs for different customers.

Figure 2B:
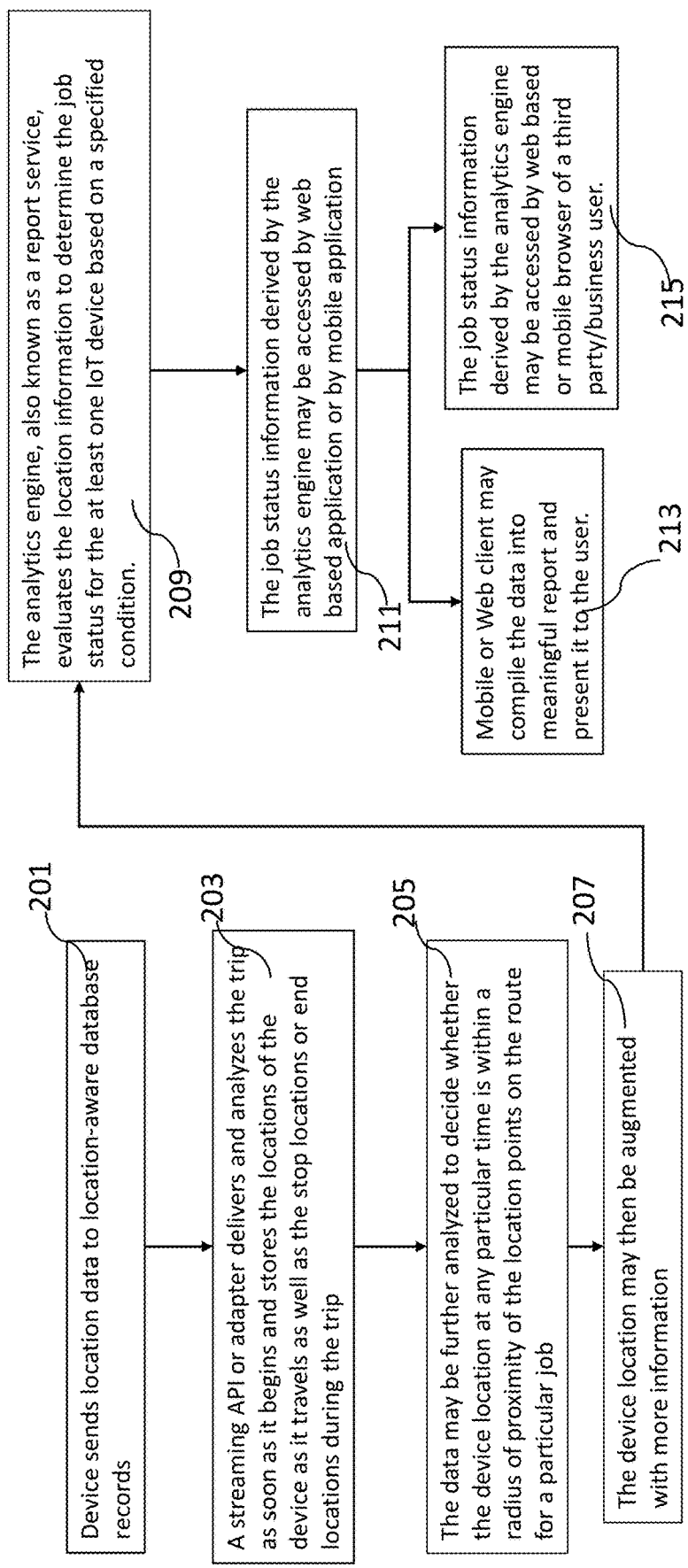
FIG. 2B illustrates an exemplary process flow for the system and method for monitoring and sharing location and activity of devices according to an embodiment described herein.

FIG. 2B illustrates an exemplary process flow for the system and method for monitoring location and activity of devices according to an embodiment described herein. As illustrated in FIG. 2B, one or more IoT devices send location data to location-aware database records via step 201. A streaming API delivers and analyzes the trip as soon as it begins and stores the locations of the device as it travels as well as the stop locations or end locations during the trip via step 203. The data may be further analyzed to decide whether the device location at any particular time or at that time is within a radius of proximity of the location points on the route for a particular job via step 205. The device location may then be augmented with more information via step 207. The analytics engine, also known as a report service, evaluates the location information to determine the job status for the at least one IoT device based on a specified condition via step 209. The job status information derived by the analytics engine may be accessed by web-based application or by mobile application via step 211. A mobile or Web client may compile the data into meaningful report and present it to the user via step 213.

In an embodiment, the job status information derived by the analytics engine may be accessed by web-based application or by mobile application of a third-party user and/or a business user via step 215. A third-party user may be describes as a user who otherwise may not have access to the information due to various reasons, e.g., no business relationship with the job management platform provider, or no permanent relationship with the job management entity or the primary user such as a business customer or consumer. A business user may be described as a user who has an established relationship such employer-employee, manufacturer-dealer, fleet provider-fleet user with the primary user (employer, manufacturer, fleet provider etc.) who in turn has a direct relationship with the job management platform provider.

For example, the system and method described herein may further allow job management user to generate share link for a specific IoT device from a job status interface for another user via another job status interface, also called as a third-party user, who otherwise may not have access to the information due to various reasons, e.g., no business relationship with the job management platform provider, or no permanent relationship with the job management entity or the primary user. The link may be shared with any user who is interested in status of the job even-though they are not provisioned in the system. On accessing the share link, the third-party user will get a view via job status Interface to receive live location information, job assignment information and job status of an IoT device. In an embodiment, the share link may be inbuilt with a hidden expiration time and hence may not be accessible once expired. Exemplary embodiment describing one or more methods and systems for sharing job status information with third party users are illustrated by FIGS. 3A-D, and described in detail in the descriptions accompanying FIGS. 3A-D.

Additional exemplary embodiments of the system and method described herein may allow sharing job status information with business users as illustrated by FIGS. 4A-C and 5A-D and described in detail in the descriptions accompanying FIGS. 4A-C and 5A-D. For example, FIG. 4A-C illustrate an exemplary embodiment, the system and method described wherein may further allow job management user who owns the job management platform to share the location/job status with their business consumers on demand, at a regular time interval or at a pre-determined time. Similarly, for example, FIGS. 5A-D illustrate an exemplary embodiment, the system and method described wherein may further allow job management user who manages the job management platform may be interested to get more insights about how his assets are performing on the field.

For example, once a job is received, it is entered into the system as starting point/location, end point/location, or multiple pickup and drop-off points/locations, vehicle assigned to job, driver assigned to job, expected start time and expected end time and customer information including name and address of the customer. The method and system then track the location, e.g., latitude-longitude, street address, etc., of the assigned device along with other device data including device activity. The method and system thus track the status of the assigned jobs based on the location of the device, for example, jobs not started, job in progress, or job completed. For example, if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". The system and method may use other naming system and criteria to determine the job status for the IoT device as determined by the application provider and/or fleet operator.

Additionally or alternatively, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Location based data analytics may be used to automate the process for the repeat jobs based on data analytics and machine learning. For example, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Location based data analytics may be used to automate the process for repeat jobs based on data analytics and machine learning. Learned locations and/or learned routes enable the system to automatically detect a location pattern for a particular job and to create and use the automatic geofences created around learned locations, e.g., pick-up & drop-off locations, or geofences created around learned routes, e.g., based on starting location and destination location, to automate the creation and execution of a job.

In an embodiment, the location patterns may be based on learning new locations of interest and using the learned locations of interest to determine geofences for starting location of the trip, destination location for a trip, multiple destinations, e.g., pick-up and drop-off locations, for a trip, etc. This location detection and learning new location using IoT devices is described in the related U.S. patent application Ser. No. 16/014,126, entitled, "LEARNING LOCATIONS OF INTEREST USING IoT DEVICES", filed Jun. 21, 2018 which is incorporated herein by reference in its entirety.

Additionally or alternatively, the location patterns may be based on learning routes and using the learned routes to determine geofences for the routes to be taken by the vehicle to complete the assigned job based on starting location of the trip, destination location for a trip, multiple destinations, e.g., pick-up and drop-off locations, for a trip, etc. This learning routes and automatic geofencing using IoT devices is described in the related U.S. patent application Ser. No. 15/970,061, entitled "LEARNING COMMON ROUTES AND AUTOMATIC GEOFENCING IN FLEET MANAGEMENT", filed May 3, 2018 which is incorporated herein by reference in its entirety.

The method and system may also track the overall on-time completion rate (what % completed on-time versus not), job completion performance of drivers (on-time completion rate) and driver behavior including excessive braking, acceleration, hard left or right turns. The driver behavior may be analyzed to give a driver score, for example, higher score may mean better driving behavior. Alternatively or additionally, the method and system may also track completion rate of jobs for different drivers and/or for different customers.

Figure 3A:
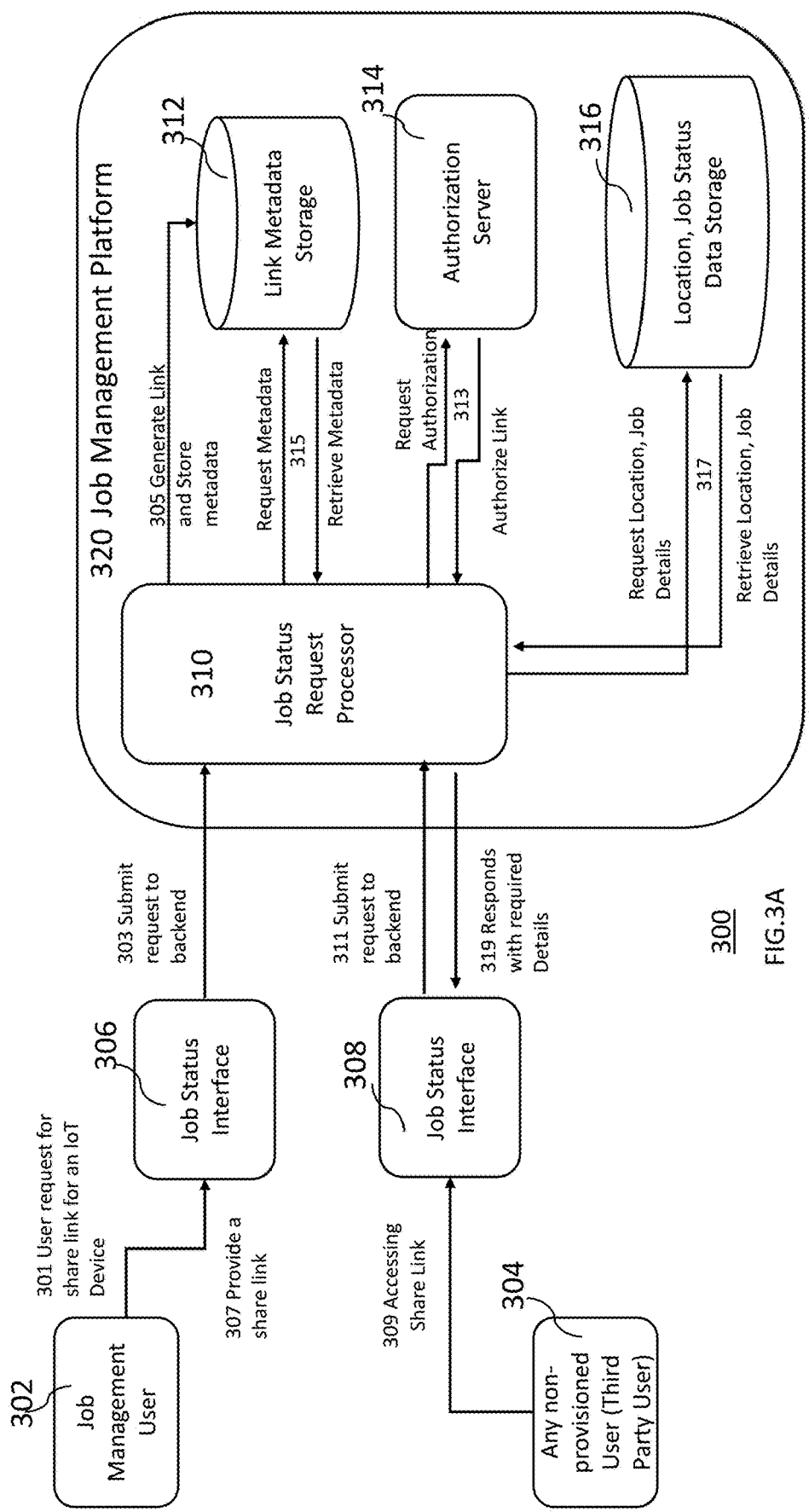
FIG. 3A is an exemplary process flow for the method and system for sharing location and activity of devices according to one or more embodiments described herein.

FIG. 3A is an exemplary process flow for the method and system for sharing location and activity of devices according to one or more embodiments described herein. For example, FIG. 3A illustrates an exemplary embodiment, the system and method described wherein may further allow job management user to generate share link for a specific IoT device from a job status interface for another user, also called as a third-party user, who otherwise may not have access to the information due to various reasons, e.g., no business relationship with the job management platform provider, no permanent relationship with the job management entity or the primary user etc. The third-party user may be implicitly authorized to access the data for the limited purpose, limited time and limited number of devices. The link may be shared with any user who is interested in status of the job eventhough they are not provisioned in the system. On accessing the share link, the third-party user may view live location information, job assignment information and job status of an IoT device via job status Interface as and when needed. The share link may be inbuilt with a hidden expiration time and hence will not be accessible once expired.

The system for sharing location and activity of devices according to one or more embodiments described herein includes one or more user interfaces, for example, 306 and/or 308, to be accessed by a job management user 302 and/or any non-provisioned third-party user 304, and a job management platform 320. These user interfaces may be same or different. Although the user interface is illustrated and described here as a job status interface any suitable web or mobile user interface may be used to send a request and to view the data in various formats.

The job management platform 320 includes a job status request processor 310, a storage database 312 to store metadata such as device ID associated with the "share link", an authorization server 314 for authorization of the "share link", and a storage database 316 to store location and job status data for the one or more devices. The storage database 316 corresponds to the storage database 106 illustrated in FIG. 1 and is described in detail in the description accompanying FIG. 1.

As Illustrated in FIG. 3A, the job management user, also known as a primary user 302 may send a request for a link to share data for an IoT device via the job status interface 306 to be sent to any non-provisioned user also known as a third-party user 304 via step 301. This request in then submitted to the job status request processor 310 of the job management platform 320 via step 303 for processing.

The job status request processor 310 generates the link and stores it along with the metadata defining the relationship with a particular IoT device to the storage database 312 via step 305.

The job status request processor 310 sends a request to authorize the link to the authorization server 314 via step 313. Once authorized, the job status request processor 310 retrieves the metadata from the storage database 312 via step 315.

The job status request processor 310 sends a request to retrieve location and job details to the storage database 316 that stores location and job status data for one or more assets or IoT devices via step 317.

The generated "share link" is shared with any non-provisioned user (third-party user) who can then access the location and job status data for one or more assets or IoT devices via job status interface 308 by accessing the share link via step 309 and the job status request processor 310 responds by responding with required details via step 319.

Figure 3B:
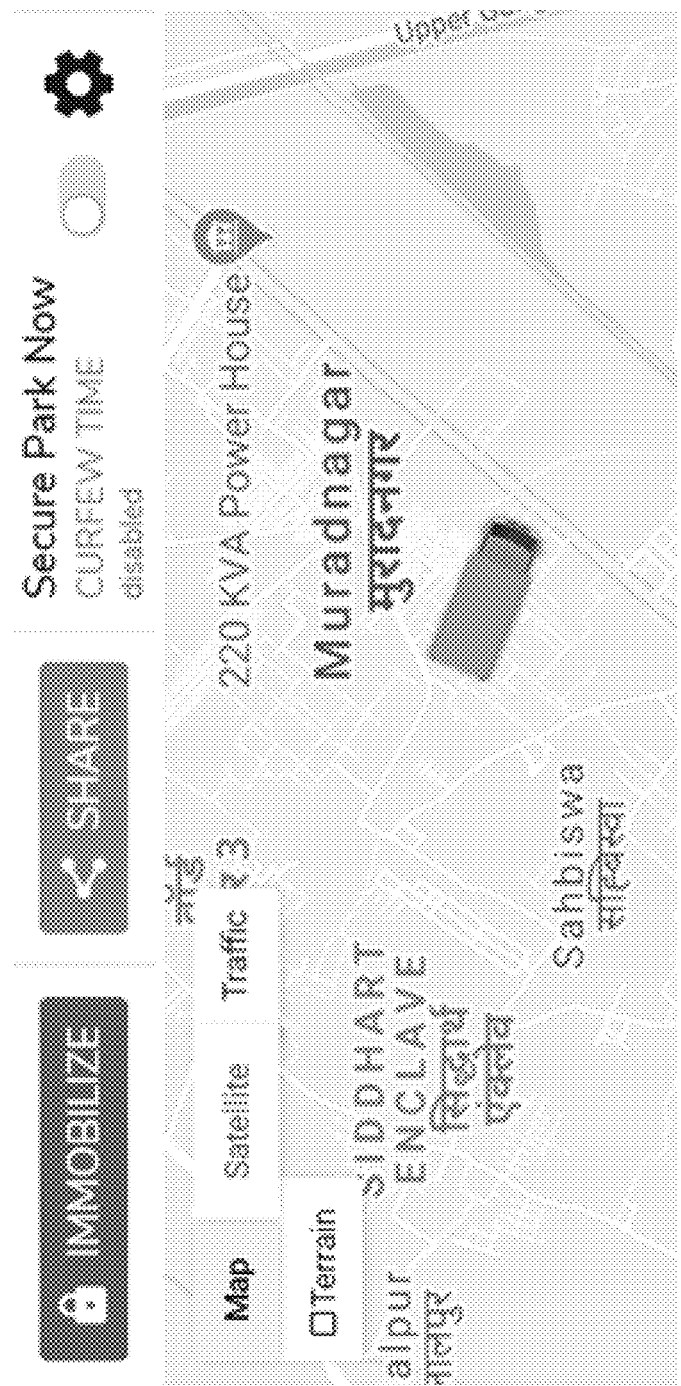
FIGS. 3B-D illustrate exemplary user interfaces for using the system and method for sharing location and activity of devices according to an embodiment described herein.
Figure 3C:
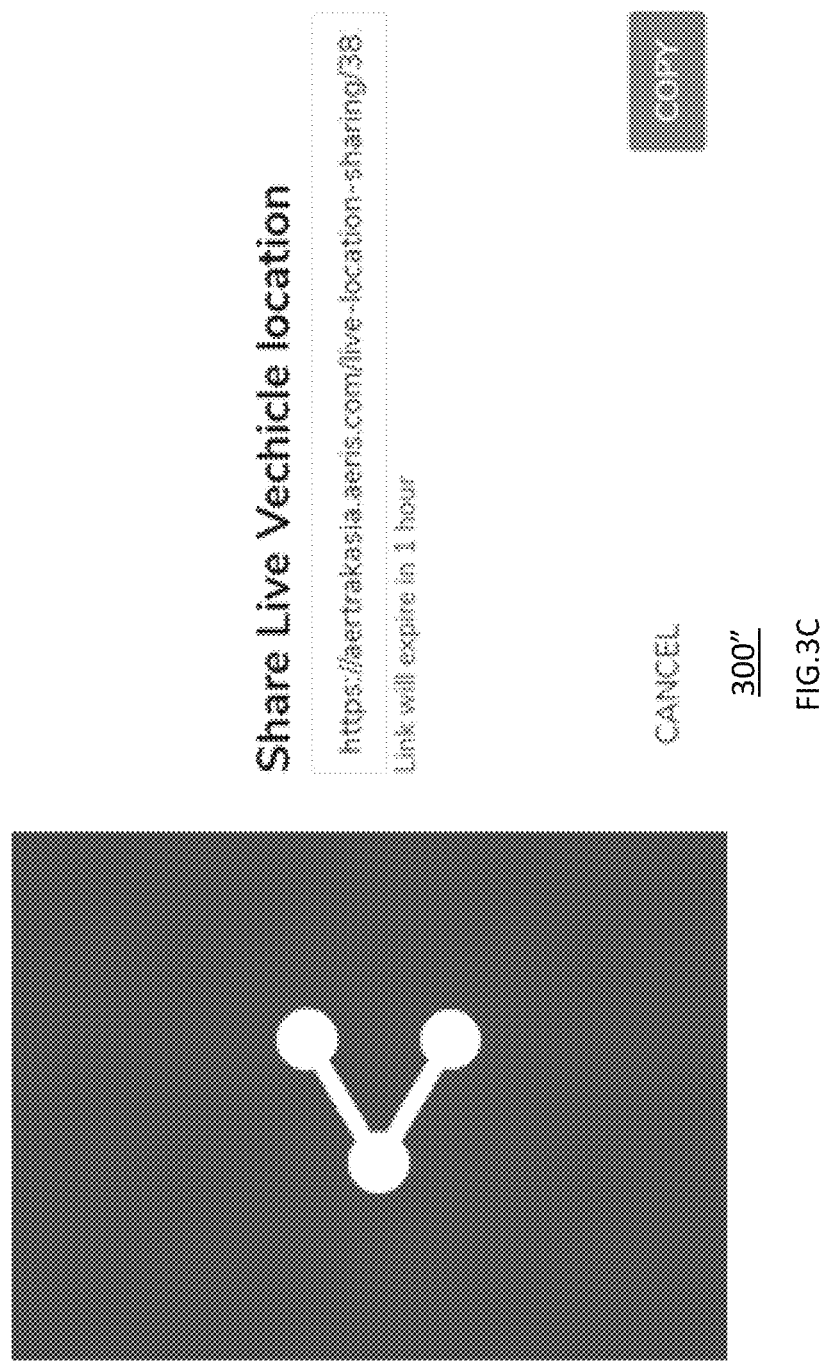
Figure 3D:
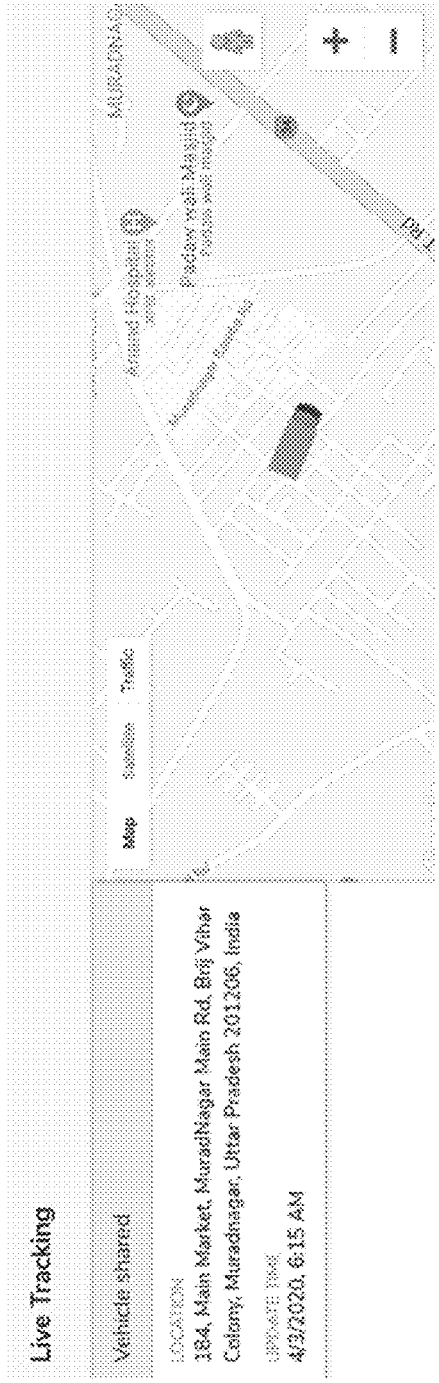

FIGS. 3B-D illustrate exemplary user interfaces for using the system and method for sharing location and activity of devices according to an embodiment described herein. FIG. 3B illustrates an exemplary user interface 300' for displaying "share" as an option in web interface to create a share link of an IoT device. This allows the job management user to generate share link for a specific IoT device from a job status interface for another user, also called as a third-party user, who otherwise may not have access to the information due to various reasons, e.g., no business relationship with the job management platform provider, no permanent relationship with the job management entity or the primary user etc.

FIG. 3C illustrates an exemplary user interface 300" where the web interface prompts a pop-up with a dynamically generated share link and indicates the expiry time.

FIG. 3D illustrates an exemplary user interface 300'" displaying an exemplary view of live tracking of one or more IoT devices when the third-party user on accesses the share link. On accessing the "share link" illustrated in FIG. 3B, the third-party user will get a view of live tracking of IoT device as illustrated in FIG. 3C, FIG. 4A is an exemplary process flow for the method and system for sharing location and activity of devices according to one or more embodiments described herein. For example, FIG. 4A illustrates an exemplary embodiment, the system and method described wherein may further allow job management user who owns the job management platform to share the location/job status with their business consumers on demand, at a regular time interval or at a pre-determined time. Those consumers may not have access to job management platform due to lack of direct relationship with the job management platform provider but may be interested in information about a particular job status at a particular time and/or on demand.

In an embodiment, the users either the user who generally has access due to his/her relationship with the job management platform provider and/or the business user may be interested in device information such as automated detection of job performance or inefficiency. For example, to detect job non-performance or inefficiency automatically, the analytics engine may automatically detect and tag an IoT asset as in efficient (may also be known as non-performing) based on data that received from that device. The analytics engine uses the consistency in data received from one or more IoT devices, number of jobs completed by the one or more IoT devices, total distance driven by the one or more IoT devices to auto-detect a non-performing or inefficient IoT device from the one or more IoT devices being tracked.

The job analytics engine may also generate a report on the nonperforming or inefficient IoT devices (assets) for a configured business unit and may be shared with them automatically via a notification method such as text, email etc. periodically. Customer/consumer user can also navigate via a web interface to look for IoT assets which are tagged as non-performing or inefficient.

The system for automatically detecting job inefficiency includes one or more devices, one or more user interfaces, for example, 420, to provide job status information to business user/s 404 and business owner 406, and a job management platform including a device adapter 408, device data processor 410, a storage database 412 for storing location and job status data, analytics engine 414 for automatic detection of non-performance or inefficiency for one or more assets or IoT devices, a database 416 for storing location and job status data, analytics engine 414 for automatic detection of non-performance or inefficiency data for one or more assets or IoT devices, a notification service 418 for periodically or on demand notification of non-performance or inefficiency data for one or more assets or IoT devices to business owner's 406 and a job status request processor 422 for processing requests received via job status interface 420 from business user's 404.

The storage database 412 corresponds to the storage database 106 illustrated in FIG. 1 and is described in detail in the description accompanying FIG. 1.

As Illustrated by FIG. 4A, one or more IoT devices $402_{1 \ldots n}$ send data to a device adapter 408 via step 401, which then sends the device data to the device data processor 410 via step 403. The device data processor 410 processes and persists data via step 405 and sends it to the storage database 412 for storing location and job status data. The analytics engine 414 analyzes the data stored in the storage database 412 for detection of non-performance or inefficiency for one or more assets or IoT devices $402_{1 \ldots n}$, The analytics engine 414 tags non-performing or inefficient devices via step 409 and stores the non-performing or inefficient job data in a storage database 416.

This stored data may be accesses by job status request processor 422 when it receives a request from the business user's or administrator 404 to look for non-performing or inefficient devices via job status interface 420 via step 413.

The notification service 418 sends notification of non-performance or inefficiency data for one or more assets or IoT devices $402_{1 \ldots n}$, periodically or on demand, to business owner/s 406 and a job status request processor 422 for processing requests received via job status interface 420 from business user/s or administrator 404.

Although the interface is illustrated and described here as a job status interface any suitable web or mobile user interface may be used to send a request and to view the data in various formats.

FIGS. 4 B-C illustrate exemplary user interfaces for using the system and method for sharing location and activity of devices according to an embodiment described herein. FIG. 4B illustrates an exemplary user interface 400' for displaying a web interface that allows the business user/s or administrator search by nonperforming/inefficient status of the IoT devices.

FIG. 4C illustrates an exemplary user interface 400" for displaying a web interface that displays search results, for example, a list of IoT devices/assets that are identified as nonperforming or inefficient. Although the exemplary user interface shown here displays the list other format displaying the search results may also displayed, including but not limited to maps, alerts, dashboard, incidents, various reports, reports history and/or historical reports and customers etc.

FIG. 5A is an exemplary process flow for the method and system for sharing location and activity of devices according to one or more embodiments described herein. For example, FIG. 5A illustrates an exemplary embodiment, the system and method described wherein may further allow job management user who manages the job management platform may be interested to get more insights about how his assets are performing on the field. This feature helps them to give an idea of job In-efficiency of the assets which comes under his portfolio, for example, hierarchical view of queries/reports for job.

For example, customers such as but not limited to enterprise customers, who use job management platform, also known as job management IoT platform, may have multiple business units based in different geographical locations or multiple business divisions. Such customers may be looking for a holistic view of information such as location, job assignment, job status, etc. for one or more IoT devices belonging to a particular business unit or at a particular geographical location. This job management platform described here relates/associates the data gathered for the one or more IoT devices in a hierarchical structure such that the requested data can be presented based on the search criteria specified in the search request.

The individual business units and/or geographical locations etc. belonging to a particular customer may be provisioned by the platform as independent accounts, but the data may be stored separately in a tree like hierarchical structure in a storage database. Every child account in the hierarchical structure may have an immediate parent account and each IoT device may be linked to a specific parent and/or child customer account. This hierarchical relationship of parent and child accounts based on geographical location is illustrated in FIG. 5C and is described in detail in the description accompanying FIG. 5C. The device information such as location of the device, job assignment for that device and job status information for that device are stored linked to the device identification for that device.

With the hierarchical data structure, the job status user interface provides a platform to query and/or generate reports for job status information, job assignment details and any processed data for all the IoT devices and/or for a particular device or for a particular group of devices that may be grouped based on geographical location of the devices and/or business unit which are in the job management user's authorized account hierarchy.

The system for monitoring job status of one or more IoT devices in a hierarchical structure/view includes one or more devices, one or more user interfaces, for example, job status interface 506, to provide job status information to job management admin account user 502 and job status interface 508, to provide job status information to job management parent account user 504, and a job management platform including a job status request processor 510, a hierarchy provisioner 512, a storage database 516 to store accounts hierarchical data, hierarchical look up manager 514 and a storage database 518 for storing location and job status data. The storage database 518 corresponds to the storage database 106 illustrated in FIG. 1 and is described in detail in the description accompanying FIG. 1.

As Illustrated in FIG. 5A, the job management admin account user, also known as a primary user 502 may submit a request to provision customer accounts via the job status interface 506 for job management parent account user 504 via step 501. This provisioning request in then submitted to the job status request processor 510 of the job management platform 520 via step 503 for processing.

The job status request processor 510 invokes hierarchy provisioner 512 via step 505, which stores the accounts belonging to a particular hierarchy to the storage database 516 that stores accounts hierarchical data via step 507.

The job status request processor 510 submits the request to provision customer accounts to the hierarchical data lookup manager 514 via step 513.

When a request for a hierarchical view of job status is received by the job status request processor 510 via the job status interface 508, step 511, from the job management parent account user 504, step 509, the hierarchical data lookup manager 514 fetches customer hierarchy data from the storage database 516 that stores accounts hierarchical data via step 515 and collects job details for the hierarchy from the storage database 518 for storing location and job status data and generate reports via step 517. The reports thus generated from all of the user's hierarchy accounts are then displayed via step 519 in the job status interface 508.

Although the interface is illustrated and described here as a job status interface any suitable web or mobile user interface may be used to send a request and to view the data in various formats.

FIG. 5B illustrates an exemplary user interface 500' for displaying a hierarchical view of child accounts in a web interface according to an embodiment described herein. As illustrated in FIG. 5B, in the hierarchical view based on geographical location, the parent account is shown by "North America Region" whose child accounts are shown as "Midwest Region", "East Region", "West Region" etc. where "Chicago Region" is shown as a child account of "Midwest Region" and "California Region" is shown as a child account of "West Region". Although the figure illustrates hierarchical view of parent and child accounts based on geographical location, similar hierarchical view of parent and child accounts may exist based on other criteria such as business unit etc.

FIG. 5C illustrates an exemplary hierarchical view 500" of parent and child accounts based on geographical location according to an embodiment described herein. As illustrated in FIG. 5C, in the hierarchical view based on geographical location, the parent account is shown by "North America Region" 520 whose child accounts are shown as "Midwest Region" $522_1$, "East Region" $522_2$, "West Region" $522_n$ etc. where "Chicago Region" may be shown as a child account of "Midwest Region" $522_1$ (not shown in the figure, but the child accounts may be represented as $526_{1-n}$ and "Washington Region" $522_1$ "California Region" $522_2$ is shown as a child account of "West Region" $522_n$. The assets $530_{1-n}$ and $532_{1-n}$ with devices capable of communication installed in them are shown to belong to "Washington Region" $522_1$ "California Region" $522_2$ respectively.

Figure 5D:
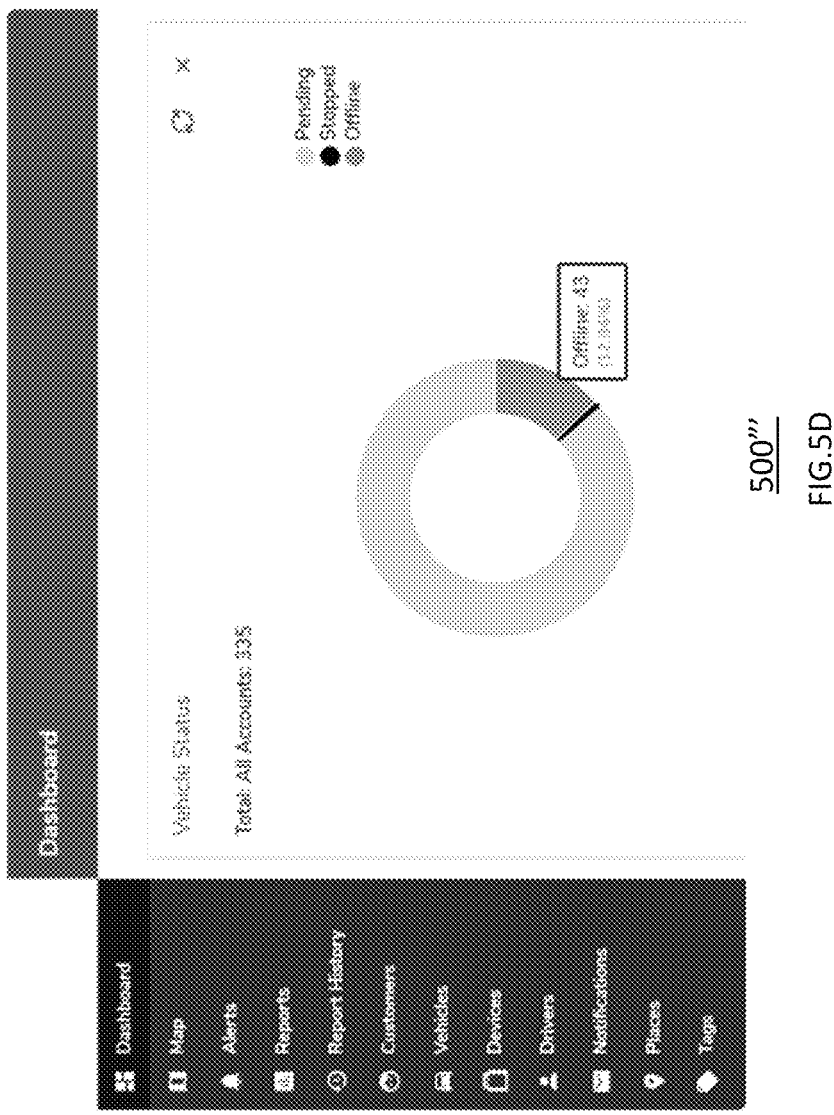
FIG. 5D illustrates an exemplary user interface for viewing IoT asset (vehicle) status for logged-in user's entire hierarchy according to an embodiment described herein.

FIG. 5D illustrates an exemplary user interface 500''' for viewing IoT asset, for example, vehicle, status for logged-in user's entire hierarchy, for example, a total count of 335 assets including all the child accounts, according to an embodiment described herein. Although, the total count of 335 assets is shown in FIG. 5D, one skilled in the art may recognize that any number of assets may be viewed using the exemplary interface.

Although the figure illustrates hierarchical view of parent and child accounts based on geographical location, similar hierarchical view of parent and child accounts may exist based on other criteria such as business unit etc. Similarly, although three levels of parent-child relationship are shown in FIG. 5C, more or less levels of parent-child relationship may exist based on the business need.

Figure 6A:
FIGS. 6A-B illustrate exemplary user interfaces for using the system and method for monitoring location and activity of devices according to an embodiment described herein.
Figure 6B:
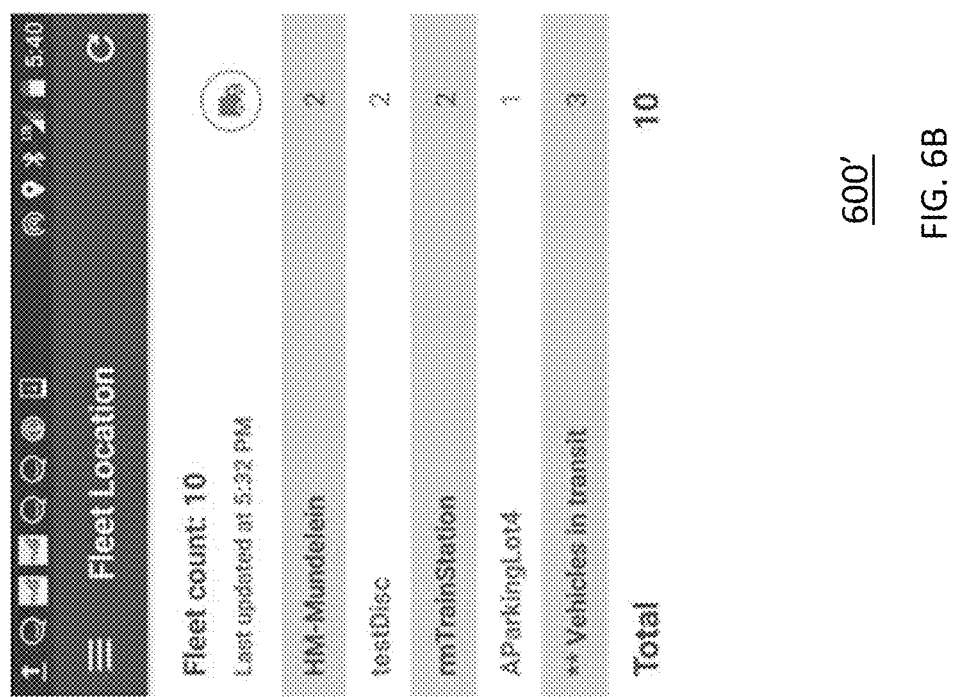

FIGS. 6A-B illustrate exemplary user interfaces for web and mobile applications using the system and method for monitoring location and activity of devices according to an embodiment described herein. FIG. 6A illustrates an exemplary user interface for a web application showing vehicle status, location, alert summary, time efficiency, vehicle usage, fuel efficiency and cost for the specified vehicle. Similar view is also available for a user interface for a mobile application.

FIG. 6B illustrates an exemplary user interface for showing fleet location and may include a summary of the location of vehicles whether at a specific place, in transit or at a location not known. In addition, the information shown in FIG. 6B may be rendered on a mobile screen as illustrated. Similar view is also available for a user interface for a web application.

The exemplary user interfaces described above and illustrated by FIGS. 6A, for a web application; and 6B, for a mobile application, show the current state of a fleet in relation to the general location of vehicles. Users, e.g., fleet managers may use it to determine if one or more vehicles belonging to a particular fleet are at a correct location for the time of day, based on job assigned to that vehicle. Additionally or alternatively, a mechanism may determine when the overall location of vehicles in the fleet are in an anomalous state for the current day and time based on the assigned job. Also, the times of day where the vehicle is not in a typical location may be indicated in a history view for that vehicle or for one or more vehicles belonging to a particular fleet.

FIGS. 7A-H illustrate exemplary user interface for using the system and method for monitoring location and activity of devices according to an embodiment described herein. For example, such a user interface may include in-depth vehicle location, history and trip activity.

Figure 7B:
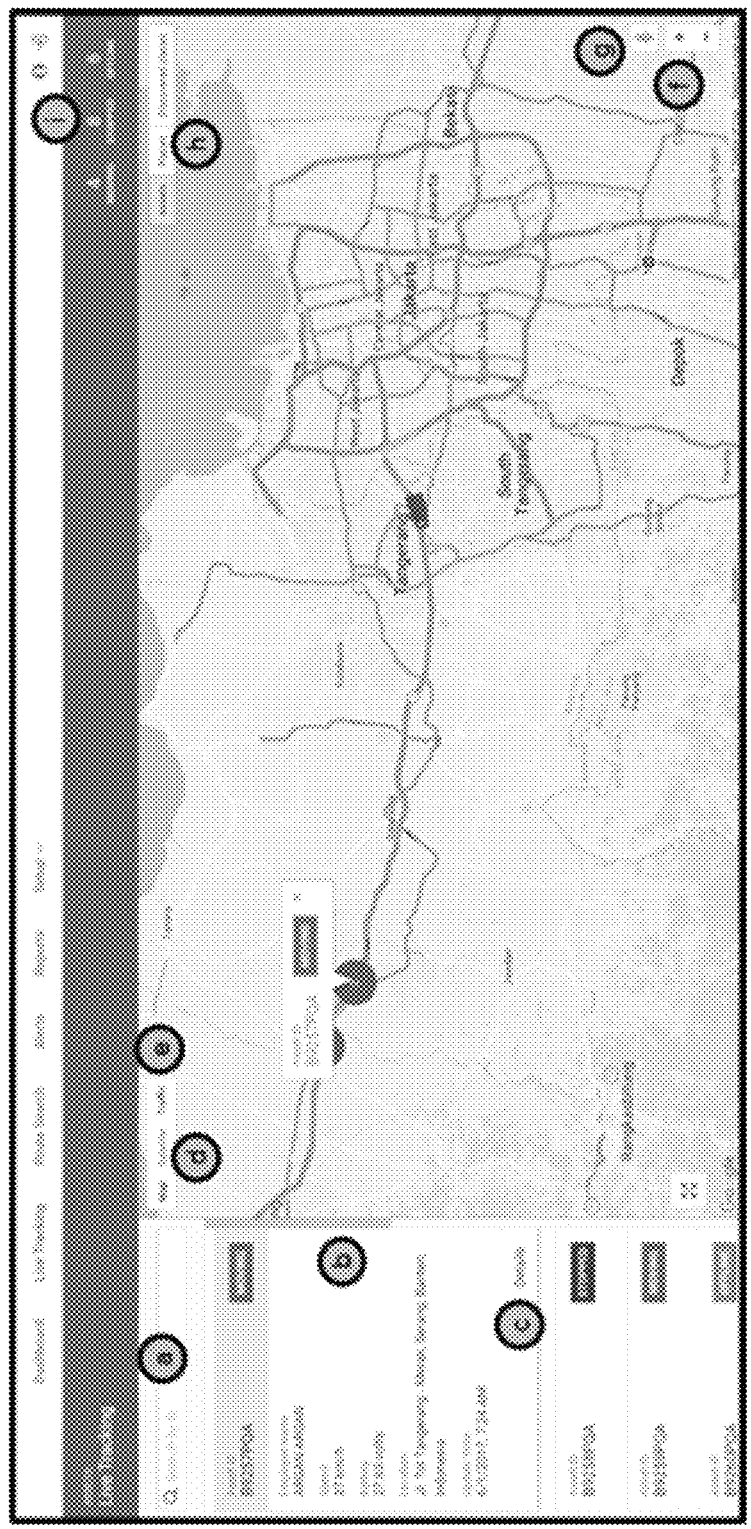

FIG. 7A illustrates live tracking which provides a convenient way to view high level and detailed information about vehicles and places. It also provides interactions that expose additional details about a vehicle. For example, clicking on a vehicle will expose additional details about that vehicle or by clicking on a circle will expose additional details about the vehicles at the location represented by that circle as illustrated in FIG. 7B.

FIG. 7B illustrates live tracking interactive map for the user to use live tracking feature, for example, (a) Search a vehicle by specifying the vehicle Id, or any vehicle related parameter, in the search box. This can be done by entering full or partial text to search the vehicle; (b) Click the vehicle card to view current details of vehicle including speed, battery voltage, location, and last update; (c) Click the Details button to view vehicle details as configured in the system, for example, vehicle name, VIN, License Plate, and so on; (d) Allows the user to toggle between Map and Satellite view; (e) Allows the user to view live Traffic on the map; (f) Allows the user to Zoom in/out the map; (g) Allows the user to see Street view of specific location by dragging it to that location; (h) Allows the user to mark locations of Vehicles, Places, and Discovered Places on the map, where user can select more than one of these options at a time; (i) Allows the user to filter vehicle list to be displayed on the map by their status as Moving, Stopped, and Offline. FIG. 4B also illustrates that by clicking on a circle will expose additional details about the vehicles at the location represented by that circle, e.g., asset ID 89257POA, moving etc.

Figure 7C:
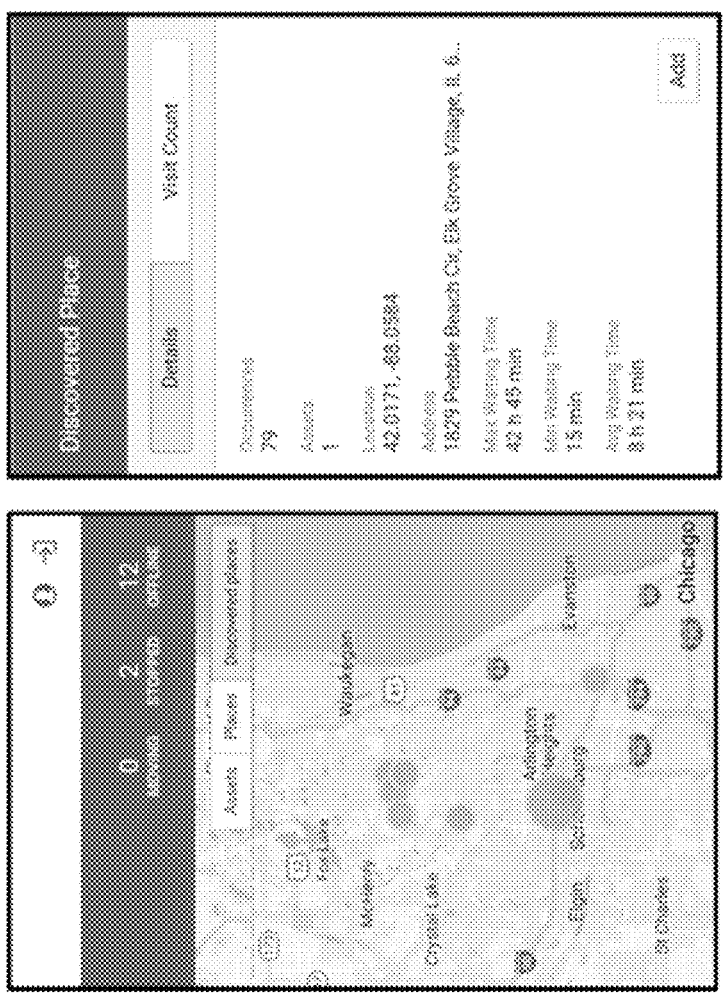

FIG. 7C illustrates location details of the vehicles at different locations including address of the location, time spent at that location, if the location is a known place or the discovered place etc. For example, the location data shown in FIG. 7B may illustrate the most frequently visited locations by the vehicles. For each frequently visited location, further details may be available.

Figure 7D:
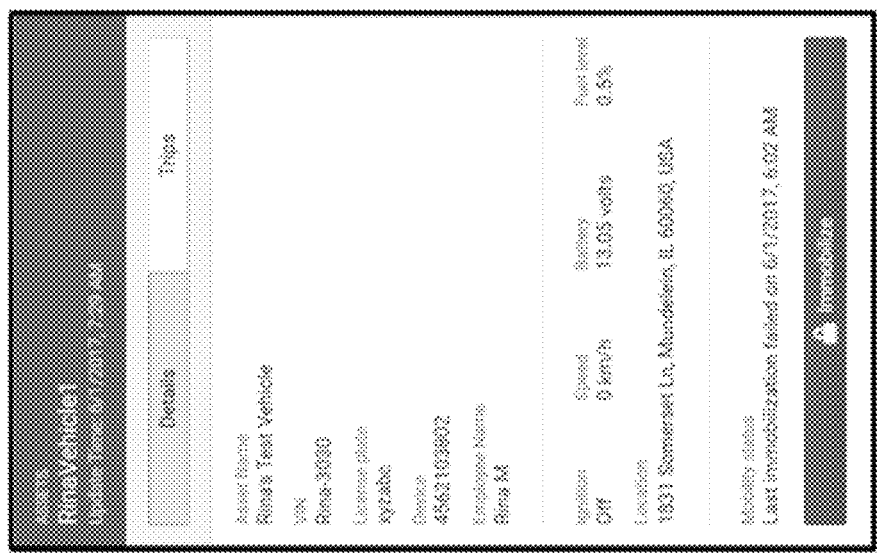

FIG. 7D illustrates vehicle details show more information about vehicle attributes and vehicle data including last known location along with other data such as ignition status, speed, battery voltage and fuel level.

Figure 7E:
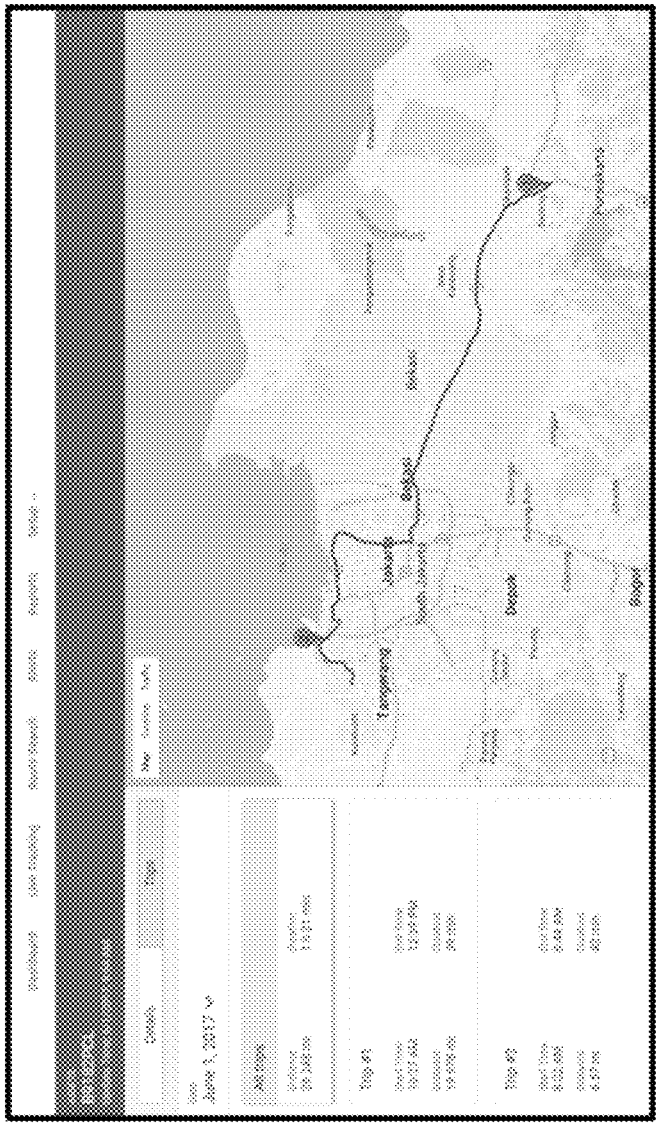

FIG. 7E illustrates trips and history where Trips are presented daily or by individual segments of a specific day. After clicking on the Vehicle's Trips, the current day's history is displayed when selecting All trips. Click Date to display the calendar and pick a different day. Map will number all trips of the day in order of their routing sequence.

FIG. 7F illustrates an exemplary user interface used to view individual trips by clicking on Trips #. The display shows individual segment of the day with start and end time and location of the trip, breadcrumbs data during route. More data details such as status, time and speed may also be viewed.

Figure 7G:
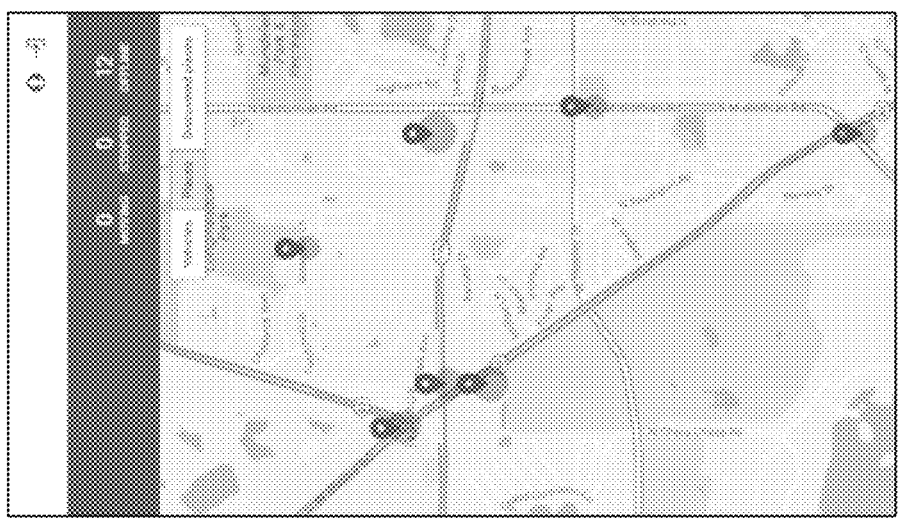

FIG. 7G illustrates any places/locations added by a user is shown by a location icon and a red circle representing its Geo-fence. The vehicles may be tracked if based on their location with respect to the geofence as well as time spent at that location, arrival time, departure time etc. A geo fence with allowable radius of proximity may be provided by the application provider and the user e.g., a fleet operator may be able to select a radius of proximity for the geofence chose by him for a particular vehicle or a number of vehicles belonging to a particular fleet. The device locations that are detected within a proximity radius of, e.g., 0.1 mile or 0.2 miles, from a place on the job route or starting and/or ending locations for a particular job may be determined by the system as the location at that point. For example, if the location of the vehicle is detected to be 0.1 mile from the starting point of the job route, the vehicle may be determined to be at the starting point of the job route.

Figure 7H:
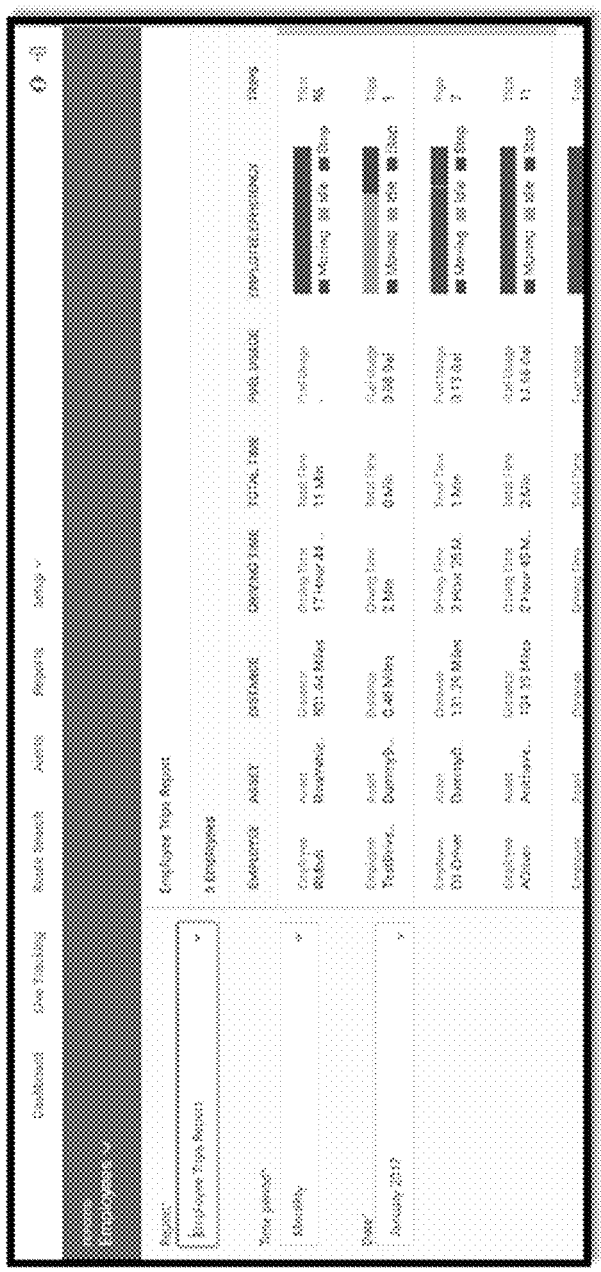

FIG. 7H illustrates an exemplary user interface, for example, trips interface to view the information about trips taken by different drivers and other relevant information like driver/employee, vehicle used, distance driven, driving time, total time, fuel used, efficiency, etc. The trips interface to view trip data, may include monthly, and daily start and end time, start and end location, total distance, duration, fuel usage, and efficiency for trip segments.

Figure 8A:
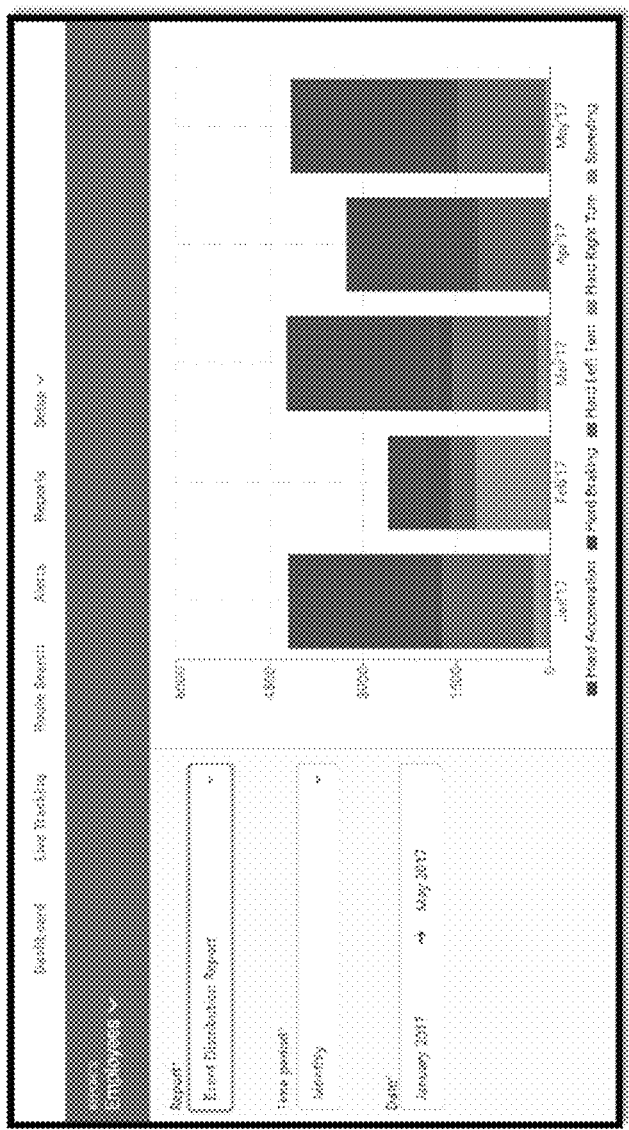
Figure 8C:
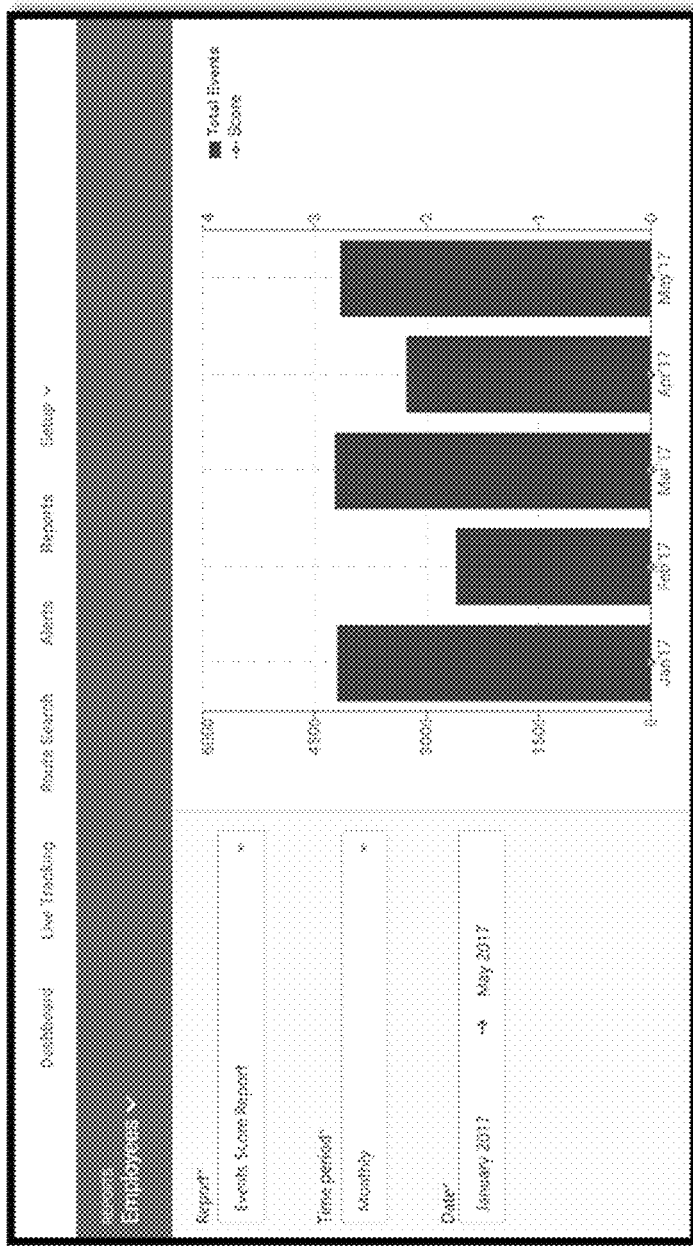

FIG. 8A-C illustrate exemplary user interface for using the system and method for receiving detailed reports on the vehicles, drivers and tracking history. For example, these figures illustrate reports for the vehicle/driver, e.g., for use in transit.

FIG. 8A illustrates an exemplary user interface used to view the overall driving behavior of all the drivers for a specific time period. The vertical stacked bar graph shows the driving events for each month.

FIG. 8B illustrates an exemplary user interface used to view relative driving behavior scores of the drivers for a specific period and ranks the drivers in the order of best to worst.

FIG. 8C illustrates an exemplary user interface used to view driver score trends and total number of driving events.

Figure 9:
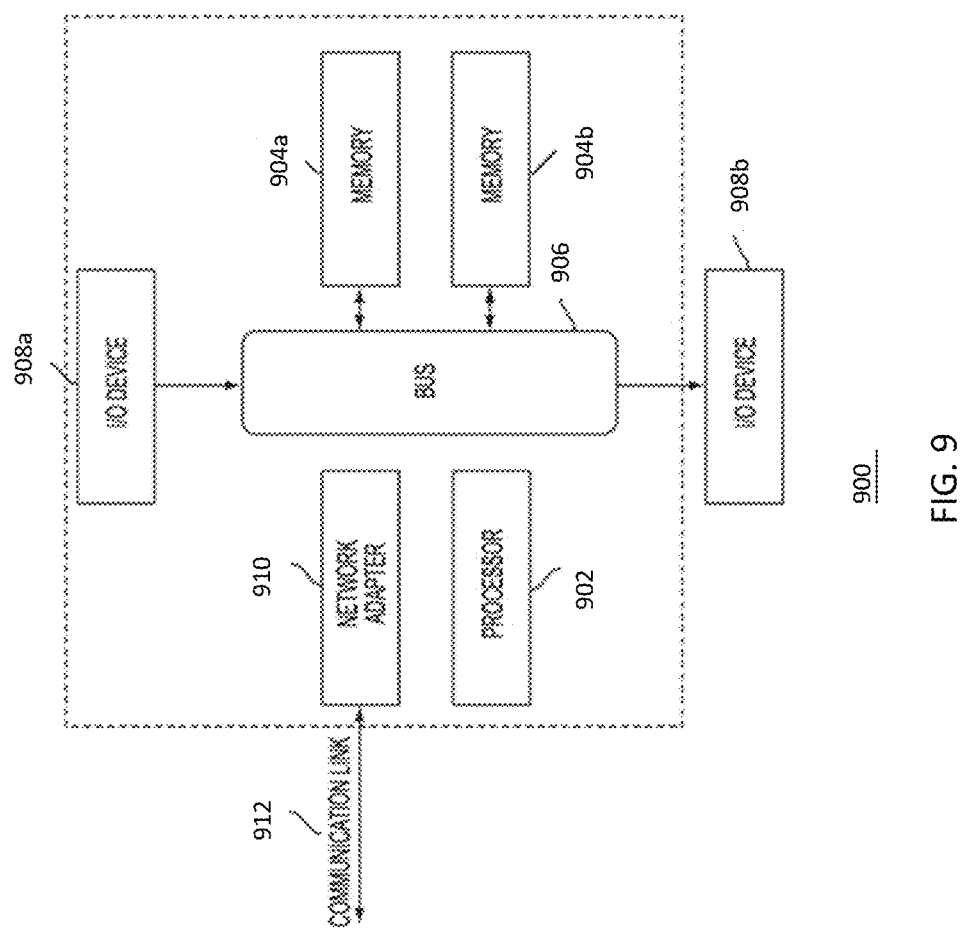
FIG. 9 illustrates a data processing system 600 suitable for storing the computer program product and/or executing program code relating to monitoring and sharing location and activity of devices in accordance with an embodiment described herein.

FIG. 9 illustrates a data processing system 900 suitable for storing the computer program product and/or executing program code in accordance with an embodiment of the present invention. The data processing system 900 includes a processor 902 coupled to memory elements 904a-b through a system bus 906. In other embodiments, the data processing system 900 may include more than one processor and each processor may be coupled directly or indirectly to one or more memory elements through a system bus.

Memory elements 904a-b can include local memory employed during actual execution of the program code, bulk storage, and cache memories that provide temporary storage of at least some program code in order to reduce the number of times the code must be retrieved from bulk storage during execution. As shown, input/output or I/O devices 908a-b (including, but not limited to, keyboards, displays, pointing devices, etc.) are coupled to the data processing system 900.

I/O devices 908a-b may be coupled to the data processing system 900 directly or indirectly through intervening I/O controllers (not shown).

In FIG. 9, a network adapter 910 is coupled to the data processing system 902 to enable data processing system 902 to become coupled to other data processing systems or remote printers or storage devices through communication link 912. Communication link 912 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "communication" is understood to include various methods of connecting any type of computing or communications devices, servers, clusters of servers, using wired and/or wireless communications networks or cellular communication networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "wireless network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI) or Bluetooth and Ethernet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention,

What is claimed is:

1. A computer implemented method for providing job status information for at least one IoT device comprising:
   receiving location information of the at least one IoT device;
   receiving job assignment information for the at least one IoT device, wherein the job assignment information for the at least one IoT device comprises start location of route for a job, destination location for the route for the job, one or more pick-up and drop-off points, vehicle assigned to job, driver assigned to job, expected start time, expected end time and customer information;
   evaluating the location information to deduce the job status for the at least one IoT device based on a specified condition, wherein the deduced job status information for the at least one IoT device comprises any of: job not started, job in progress, or job completed; and
   sharing the deduced job status information for at least one IoT device.

2. The computer-implemented method of claim 1, wherein the location information of at least one mobile device comprises latitude and longitude of the at least one IoT device.

3. The computer-implemented method of claim 2, wherein the location information of at least one mobile device further comprises any one or more of: start location of route for a job, destination location for the route for the job, time of the day for the travel, day of the week for the travel, duration of the travel, distance covered during the travel, one or more location points on the route for the job.

4. The computer-implemented method of claim 1, wherein the customer information for the job assignment further includes any one or more of name of the customer and address of the customer.

5. The computer-implemented method of claim 1, wherein evaluating the location information to determine the job status for the at least one IoT device comprises comparing location of the IoT device to any one or more of: start location of route for the job, destination location for the route for the job, one or more pick-up and drop-off points, location point along the route for the job, vehicle assigned to job, driver assigned to job, expected start time, expected end time and customer information.

6. The computer-implemented method of claim 1, wherein determining the job status for the at least one IoT device based on the specified condition further comprises determining if the location of the vehicle is within a radius of proximity from any one or more of: start location of route for the job, destination location for the route for the job, one or more pick-up and drop-off points, location point along the route for the job.

7. The computer-implemented method of claim 1, wherein sharing the job status information for at least one IoT device comprises providing a link to share information with a third party.

8. The computer-implemented method of claim 1, wherein sharing the job status information for at least one IoT device comprises providing information regarding performance of the at least one IoT device on demand, at a regular time interval or at a pre-determined time.

9. The computer-implemented method of claim 1, wherein sharing the job status information for at least one IoT device comprises providing a hierarchical view for a group of devices that includes the at least one device, wherein the devices are grouped based on criteria including any one or more of: location of the devices, business unit associated with the devices and customer account associated with the devices.

10. A system for providing job status information for at least one IoT device, the system comprising at least one IoT device, a job management platform and a user interface, wherein the data processing system further comprises:
    a storage database, wherein the storage database receives location information of the at least one IoT device and job assignment information for the at least one IoT device, wherein the job assignment information for the at least one IoT device comprises start location of route for a job, destination location for the route for the job, one or more pick-up and drop-off points, vehicle assigned to job, driver assigned to job, expected start time, expected end time and customer information; and
    an analytics engine, wherein the analytics engine evaluates the location information to deduce the job status for the at least one IoT device based on a specified condition, wherein the deduced job status information for the at least one IoT device comprises any of: job not started, job in progress, or job completed; and
    wherein the job management platform shares the deduced job status information for at least one IoT device.

11. The system of claim 10, wherein the location information of at least one mobile device comprises latitude and longitude of the at least one IoT device.

12. The system of claim 11, wherein the location information of at least one mobile device further comprises any one or more of: start location of route for a job, destination location for the route for the job, time of the day for the travel, day of the week for the travel, duration of the travel, distance covered during the travel, one or more location points on the route for the job.

13. The system of claim 10, wherein the customer information for the job assignment further includes any one or more of name of the customer and address of the customer.

14. The system of claim 10, wherein the analytics engine evaluates the location information to determine the job status for the at least one IoT device by comparing location of the IoT device to any one or more of: start location of route for the job, destination location for the route for the job, one or more pick-up and drop-off points, location point along the route for the job, vehicle assigned to job, driver assigned to job, expected start time, expected end time and customer information.

15. The system of claim 10, wherein the analytics engine determines the job status for the at least one IoT device based on the specified condition by determining if the location of the vehicle is within a radius of proximity from any one or more of: start location of route for the job, destination location for the route for the job, one or more pick-up and drop-off points, location point along the route for the job.

16. The system of claim 10, wherein sharing the job status information for at least one IoT device comprises providing a link to share information with a third party.

17. The system of claim 10, wherein sharing the job status information for at least one IoT device comprises providing information regarding performance of the at least one IoT device on demand, at a regular time interval or at a pre-determined time.

18. The system of claim 10, wherein sharing the job status information for at least one IoT device comprises providing a hierarchical view for a group of devices that includes the at least one device, wherein the devices are grouped based on criteria including any one or more of: location of the devices.

19. A non-transitory computer-readable medium having executable instructions stored therein that, when executed, cause one or more processors corresponding to a system having a database and a user interface to perform operations comprising:
receiving location information of the at least one IoT device;
receiving job assignment information for the at least one IoT device, wherein the job assignment information for the at least one IoT device comprises start location of route for a job, destination location for the route for the job, one or more pick-up and drop-off points, vehicle assigned to job, driver assigned to job, expected start time, expected end time and customer information;
evaluating the location information to deduce the job status for the at least one IoT device based on a specified condition, wherein the deduced job status information for the at least one IoT device comprises any of: job not started, job in progress, or job completed; and
sharing the deduced job status information for at least one IoT device.

20. The non-transitory computer-readable medium of claim 19, wherein the location information of at least one mobile device comprises latitude and longitude of the at least one IoT device.

21. The non-transitory computer-readable medium of claim 20, wherein the location information of at least one mobile device further comprises any one or more of: start location of route for a job, destination location for the route for the job, time of the day for the travel, day of the week for the travel, duration of the travel, distance covered during the travel, one or more location points on the route for the job.

22. The non-transitory computer-readable medium of claim 19, wherein the customer information for the job assignment further includes any one or more of name of the customer and address of the customer.

23. The non-transitory computer-readable medium of claim 19, wherein evaluating the location information to determine the job status for the at least one IoT device further comprises instructions for comparing location of the IoT device to any one or more of: start location of route for the job, destination location for the route for the job, one or more pick-up and drop-off points, location point along the route for the job, vehicle assigned to job, driver assigned to job, expected start time, expected end time and customer information.

24. The non-transitory computer-readable medium of claim 19, wherein determining the job status for the at least one IoT device based on the specified condition further comprises instructions for determining if the location of the vehicle is within a radius of proximity from any one or more of: start location of route for the job, destination location for the route for the job, one or more pick-up and drop-off points, location point along the route for the job.

25. The non-transitory computer-readable medium of claim 19, wherein sharing the job status information for at least one IoT device comprises providing a link to share information with a third party.

26. The non-transitory computer-readable medium of claim 19, wherein sharing the job status information for at least one IoT device comprises providing information regarding performance of the at least one IoT device on demand, at a regular time interval or at a pre-determined time.

27. The non-transitory computer-readable medium of claim 19, wherein sharing the job status information for at least one IoT device comprises providing a hierarchical view for a group of devices that includes the at least one device, wherein the devices are grouped based on criteria including any one or more of: location of the devices.

* * * * *